April 1, 1958

G. O. CONNER 2,828,492

NUT TAPPING MACHINE HAVING RELEASABLE TAP
HOLDING MEANS TO DISCHARGE
TAPPED NUTS THEREFROM

Filed March 12, 1951

INVENTOR.
GUY O. CONNER

BY
J. O. Douglas
His atty

INVENTOR.
GUY O. CONNER

INVENTOR.
GUY O. CONNER

April 1, 1958

G. O. CONNER 2,828,492

NUT TAPPING MACHINE HAVING RELEASABLE TAP
HOLDING MEANS TO DISCHARGE
TAPPED NUTS THEREFROM

Filed March 12, 1951

INVENTOR.
GUY O. CONNER
BY

April 1, 1958

G. O. CONNER 2,828,492

NUT TAPPING MACHINE HAVING RELEASABLE TAP
HOLDING MEANS TO DISCHARGE
TAPPED NUTS THEREFROM

Filed March 12, 1951

INVENTOR.
GUY O. CONNER
BY
J. W. Douglass
His atty

April 1, 1958 G. O. CONNER 2,828,492
NUT TAPPING MACHINE HAVING RELEASABLE TAP
HOLDING MEANS TO DISCHARGE
TAPPED NUTS THEREFROM
Filed March 12, 1951 19 Sheets-Sheet 7
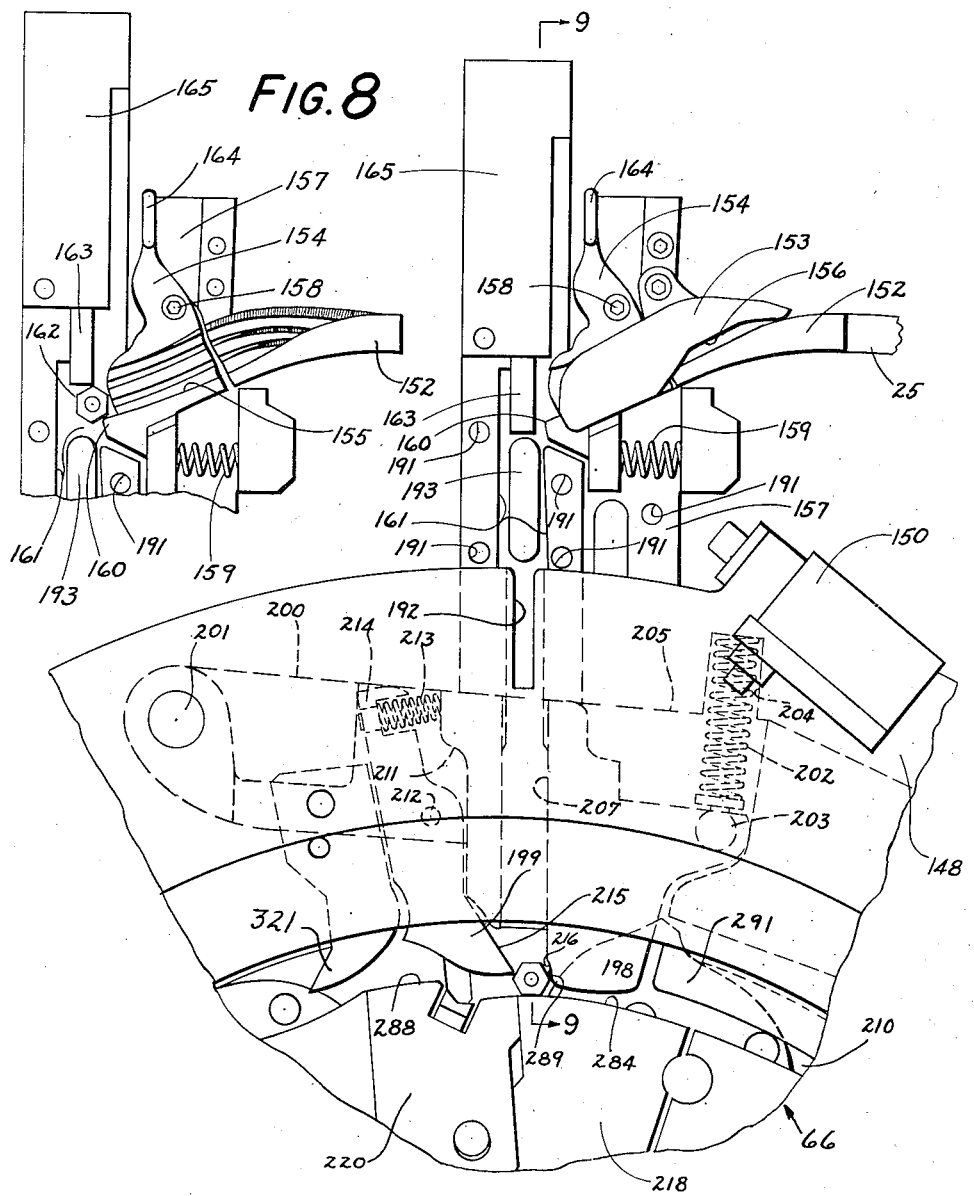
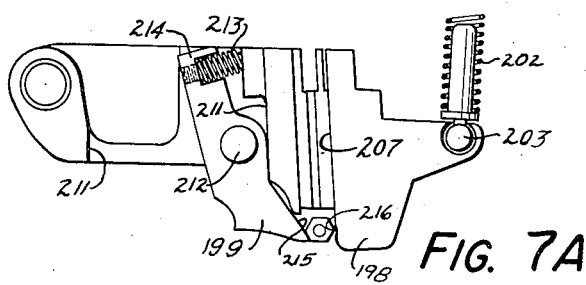
INVENTOR.
GUY O. CONNER April 1, 1958

G. O. CONNER 2,828,492

NUT TAPPING MACHINE HAVING RELEASABLE TAP
HOLDING MEANS TO DISCHARGE
TAPPED NUTS THEREFROM

Filed March 12, 1951

INVENTOR.
GUY O. CONNER
BY
J. U. Douglass
His atty

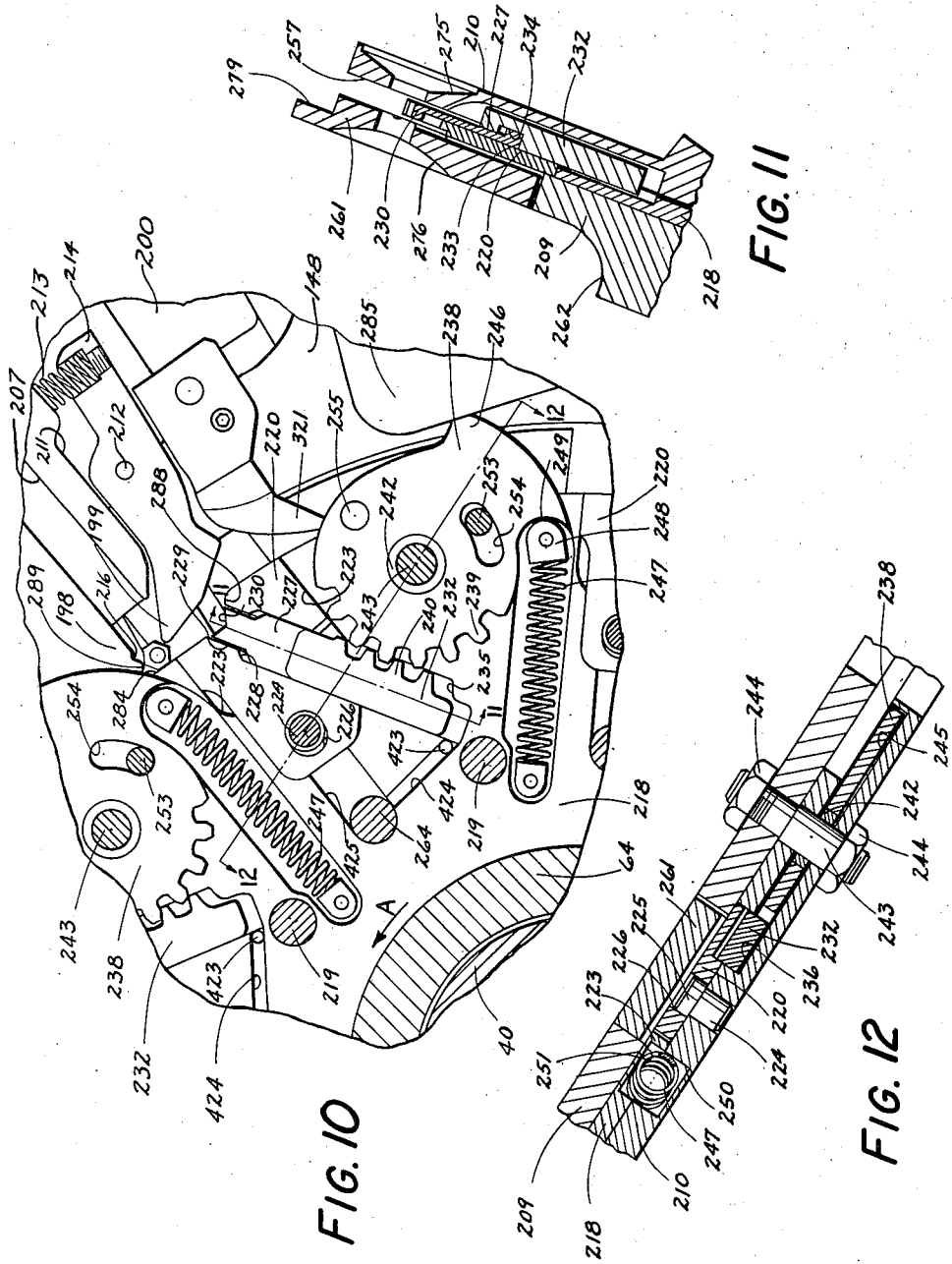

April 1, 1958  G. O. CONNER  2,828,492
NUT TAPPING MACHINE HAVING RELEASABLE TAP
HOLDING MEANS TO DISCHARGE
TAPPED NUTS THEREFROM
Filed March 12, 1951  19 Sheets-Sheet 11

INVENTOR.
GUY O. CONNER
BY
J. D. Douglas
his atty.

April 1, 1958

G. O. CONNER 2,828,492

NUT TAPPING MACHINE HAVING RELEASABLE TAP
HOLDING MEANS TO DISCHARGE
TAPPED NUTS THEREFROM

Filed March 12, 1951

INVENTOR.
GUY O. CONNER
BY
*J. D. Douglas*
*his atty*

INVENTOR.
GUY O. CONNER

April 1, 1958 G. O. CONNER 2,828,492
NUT TAPPING MACHINE HAVING RELEASABLE TAP
HOLDING MEANS TO DISCHARGE
TAPPED NUTS THEREFROM
Filed March 12, 1951 19 Sheets-Sheet 15

INVENTOR.
GUY O. CONNER
BY
J. W. Douglass
His atty

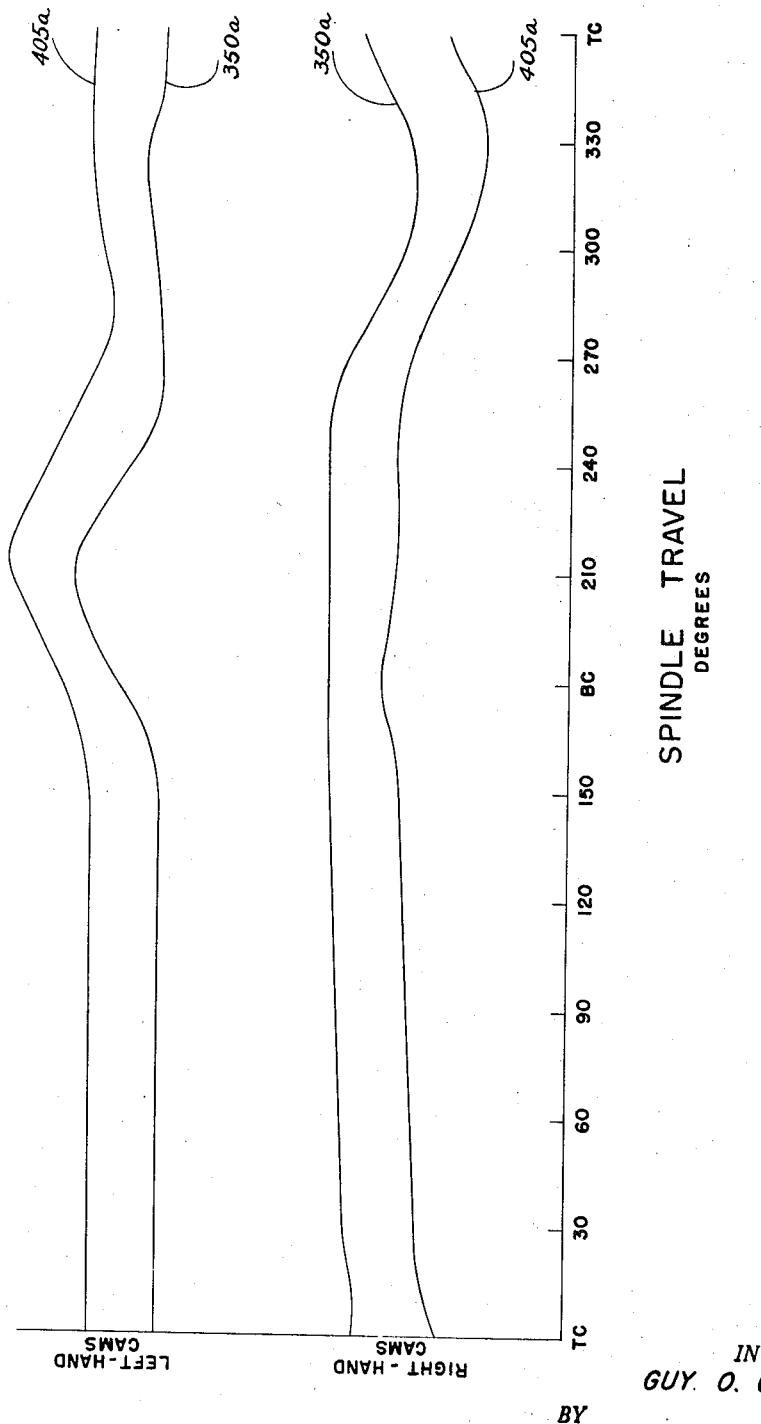

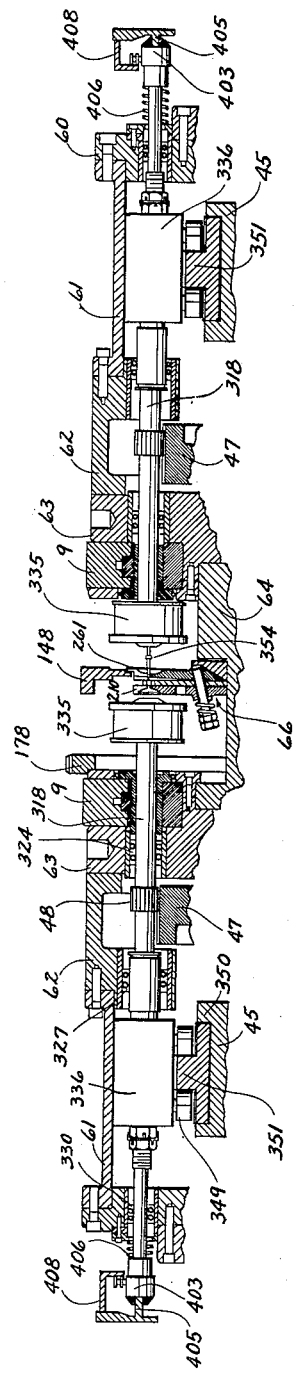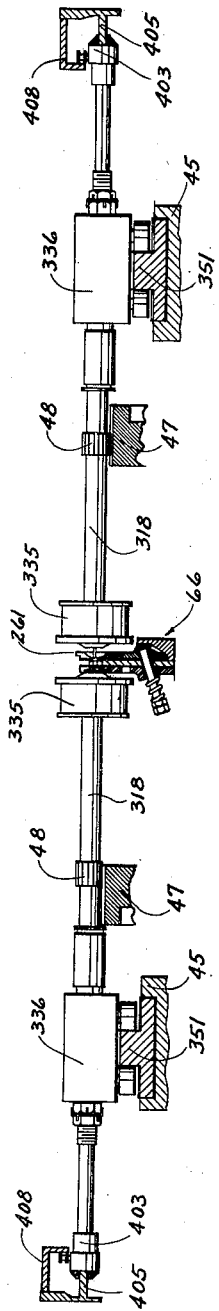
FIG. 23
FIG. 24

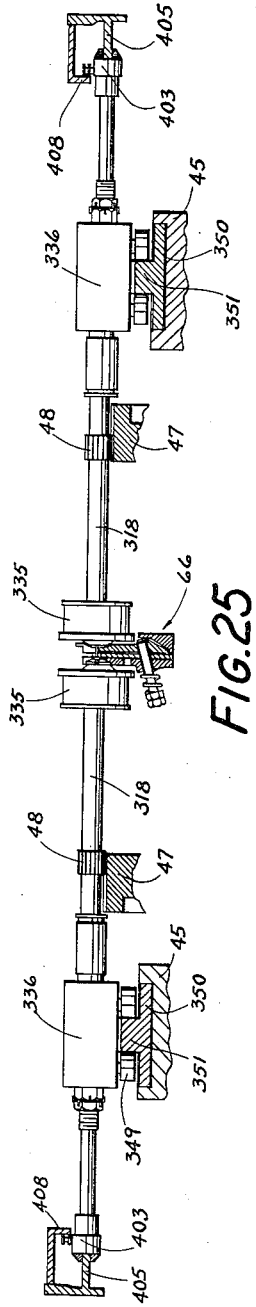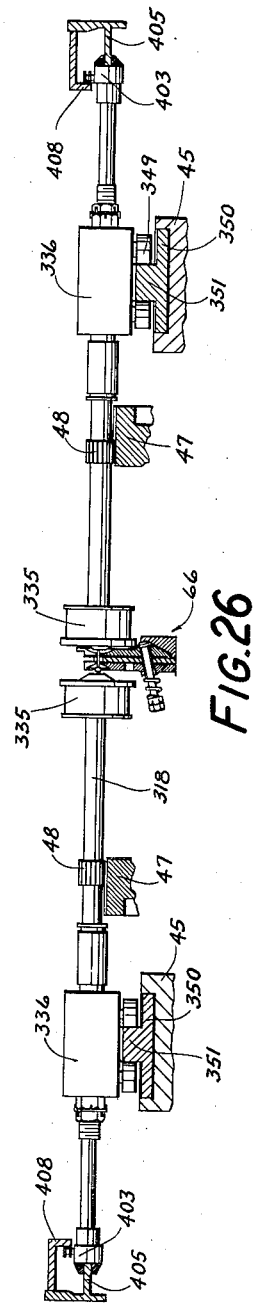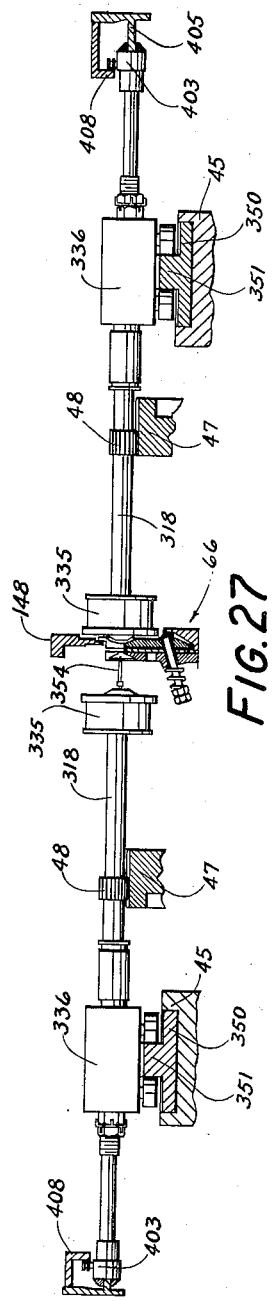

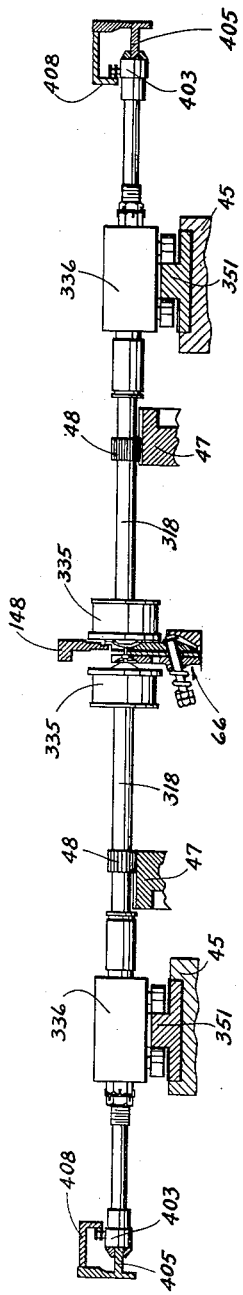
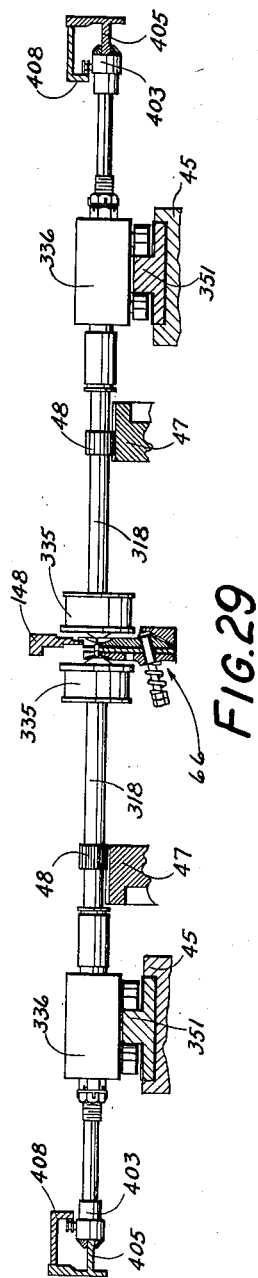
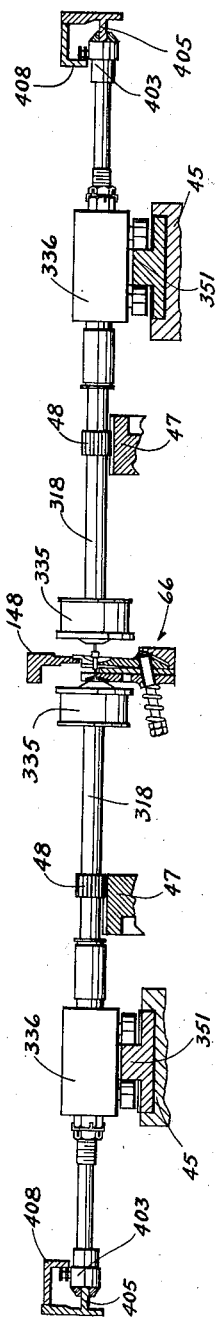

United States Patent Office 2,828,492
Patented Apr. 1, 1958

2,828,492

NUT TAPPING MACHINE HAVING RELEASABLE TAP HOLDING MEANS TO DISCHARGE TAPPED NUTS THEREFROM

Guy O. Conner, Cleveland Heights, Ohio, assignor to Republic Steel Corporation, Cleveland, Ohio, a corporation of New Jersey Application March 12, 1951, Serial No. 215,131

13 Claims. (Cl. 10—134)

This invention pertains to machine tools for forming metal and more particularly to a machine adapted for high speed performance of a variety of operations such as spinning, tapping, drilling or the like. The invention has a particular utility in the tapping or threading of nuts, and other operations similar to these.

Current practice in the threading of nuts utilizes a machine in which the tapping tool is bent at the end opposite the working end and is loosely disposed in a complementary recess in the machine. Onto this the nuts are threaded, while the tap is prevented from rotating and is held against longitudinal motion by the bent end. As the nuts are finished, they slide along the tool, around the bent end and off into a receptacle. The cost of these taps is considerable, but other more serious disadvantages are also present. Because of the looseness of the tool in its recess, it has heretofore been virtually impossible to get a fit closer than class 1 or 2 on a nut produced by such methods. The device also is relatively slow and the finish on the threads poor, compared to that on the bolts onto which the nuts are to be threaded.

Many other devices have been proposed for this type of work. In some, the tap was driven in and then reversed to recover the tool. This was expensive both in time and in tool wear, since the tool passed through the workpiece twice for one operation. Other devices used a rotating head having a plurality of vertical spindles. In these, the tap would be driven through the nut, drop into a cup and then be picked up again by the spindle as the nut was moved out of the way. These, too, were not entirely satisfactory, partly because the tap could not be held tightly enough to produce an accurate thread.

With the machine of my invention, most of the disadvantages of prior art machines are avoided. In addition, great savings are possible. As an example, a single machine made according to my invention may be made to produce as many nuts in a given time as from 10 to 20 of present day machines. Moreover, by such a device, a single operator may tend each machine where under present day conditions an operator customarily tends two machines. Thus, for a unit labor cost, a machine built according to my invention will produce from five to ten times as many nuts. Further savings are possible in floor space, where my machine requires about the same space as present day machines, and in power. This latter saving amounts to nearly fifty percent based on tests of an eight spindle machine built according to my invention. The total effect of these savings makes possible extremely fast production of the product of the machine at low cost, both in direct cost of the product and in overhead.

In addition to lessened cost, the quality of the product is greatly improved. Where with present day machines nut threads having a fit of class 1 or 2 are ordinarily produced and a class 3 fit is rare; with a machine of my invention, nuts of class 4 fit may easily be produced, and class 5 fits are not uncommon. In order to achieve this sort of fit, it is obvious that no tearing of metal nor looseness of parts can be allowed. These conditions also make possible a much better finish on the surface of the threads with the resultant advantages of increased strength and ease of threading.

All of these advantages are possible because of my invention which is embodied in a multi-spindle machine having a high speed feed mechanism capable of furnishing work blanks to the machine in a continuous stream. These blanks are held loosely in the machine until properly aligned with the tool at which point they are securely clamped in perfect alignment. The tools are driven through the blank by spindles which are, in turn, governed by cams on the machine. These tools are short and are firmly held at both ends while cutting the thread. The machine therefore eliminates all play in the spindles, tools and the workpiece. A novel system for keeping the machine free of metal chips and the like is also provided.

A more complete understanding of the device of the invention, and the invention itself, may be had by reference to the following description and drawings which form a part of this specification.

In the drawings:

Fig. 7 is a detailed elevational view of the injector mechanism from the same side as Fig. 5 and rotated approximately 45 degrees to an upright position, some of the parts having been removed to show underlying parts;

Fig. 7A is an elevational view of the feeder piece 200 removed from its surroundings and drawn to a reduced scale;

Fig. 8 is a detailed view of the inlet of the injector with the cover removed;

Fig. 10 is an enlarged detailed view of a portion of Fig. 6;

Fig. 11 is a sectional view along line 11—11 of Fig. 10;

Fig. 12 is a sectional view along line 12—12 of Fig. 10;

Fig. 22 is a graph showing the shape of the cams at corresponding locations;

Figure 4:
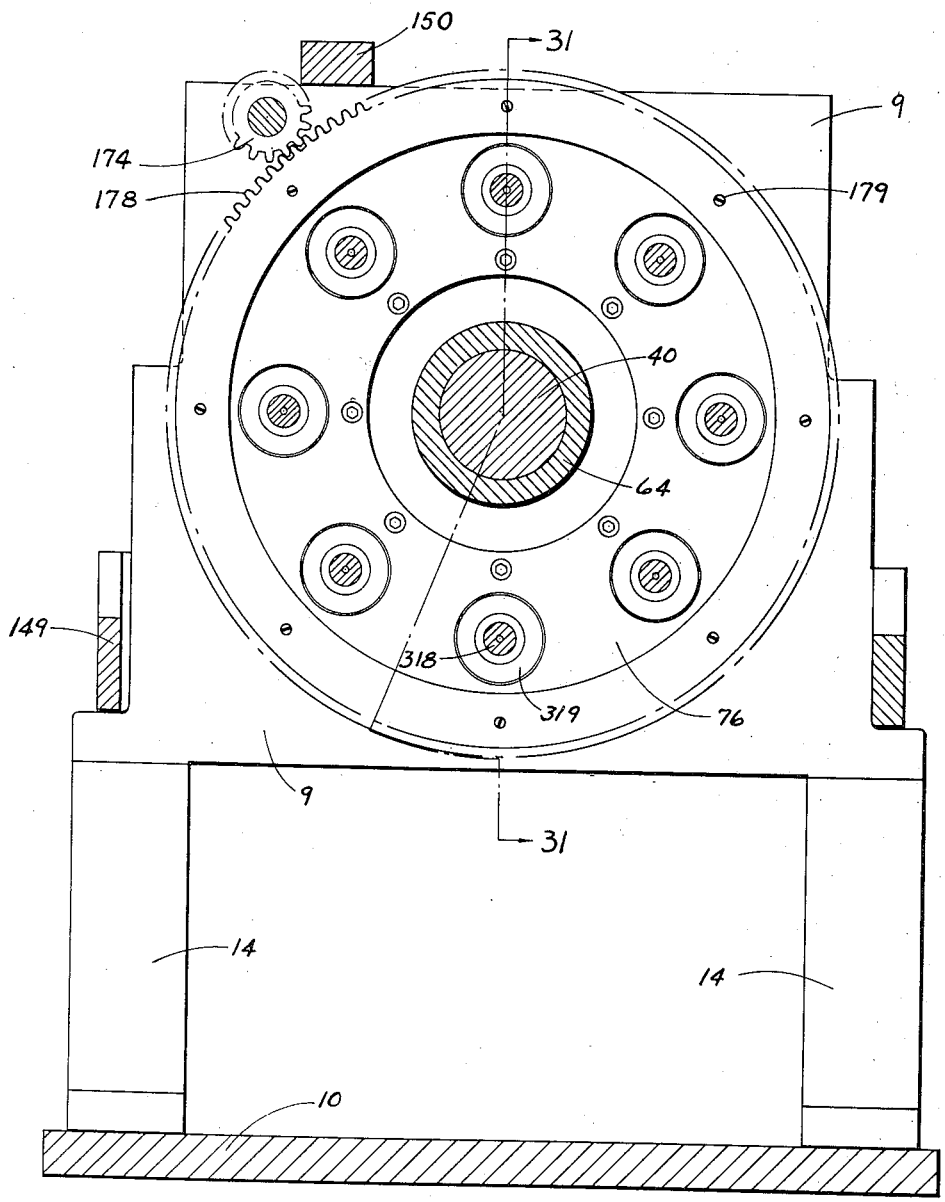
Fig. 4 is a sectional view along line 4—4 of Fig. 3.
Figure 31:
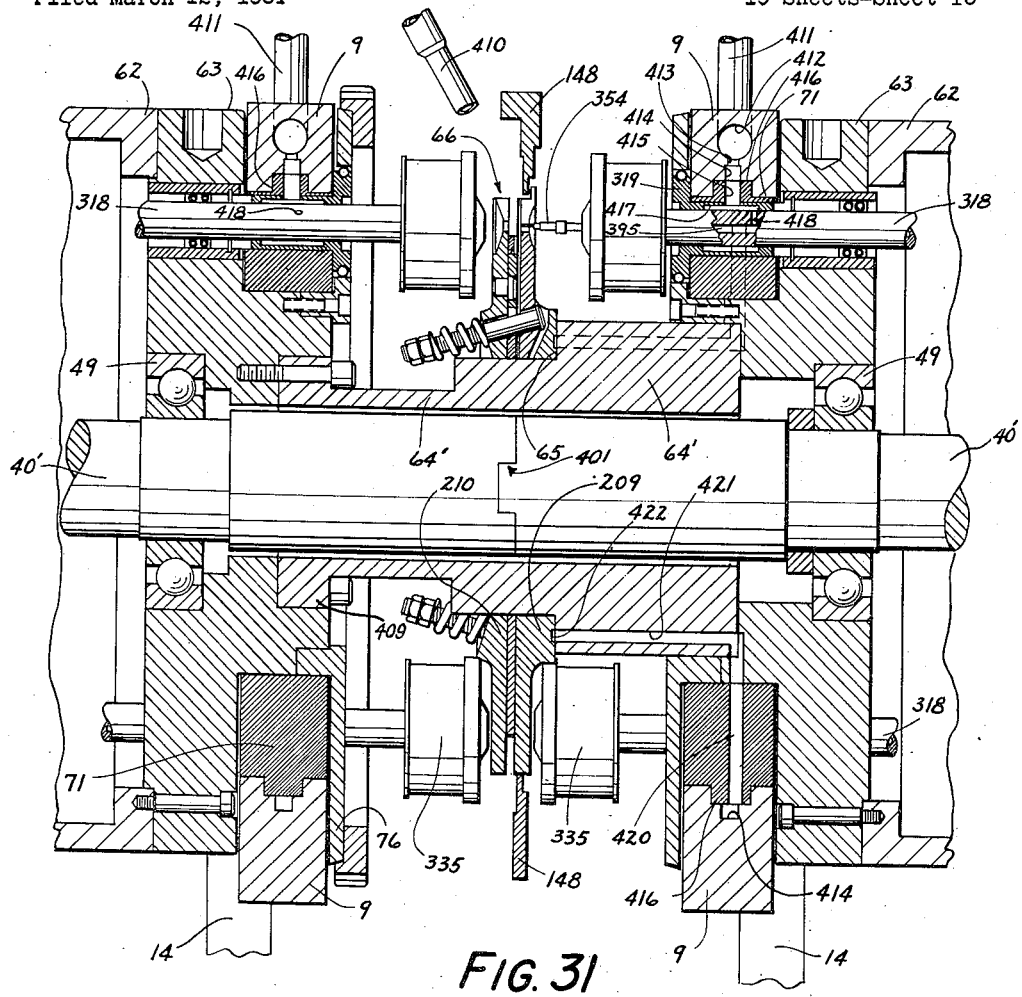

Figs. 23–30 inclusive are progressive, partly diagrammatic, sectional views showing the location of the spindles at eight different circumferential points in the travel of the spindles; each of the views being taken on a plane including the centerlines of the spindle and the main shaft looking in the direction of rotation, the views each being turned upright for uniformity;

Fig. 31 is a sectional view through the center section of the machine along the line 31—31 of Fig. 4 showing the cutting fluid distribution system.

Briefly, my invention comprises an automatic machine having one or more horizontal spindles operated from a central shaft. The spindles, in addition to being rotated about the central axis of the machine, revolve to drive a tool and are moved axially by a stationary cam or similarly actuating mechanisms. The spindles are very accurately and firmly located to avoid misalignment or play. The spindles are arranged around the central axis of the machine in two matched sets, each spindle having an axially aligned, matching spindle facing it from the opposite set. Novel tool-holding heads are provided for the spindles. These heads are adapted to hold a tool very firmly yet are able to release the tool to be picked up by the opposite head. Cam operated rods extending through the spindles provide positively operated means for passing the tool from one head to another. The tool must be provided with shanks at both ends of the thread cutting part for the heads to grasp in order for the tool to be passed in this manner. It is conceived, however, that for some operations, the tool will not be passed, but that complementary tools may be held by opposing spindles thus performing different types of operation.

The center of the machine between the two spindles is occupied by a work-holding mechanism adapted to receive a workpiece for each pair of spindles. The work holder securely clamps the workpiece in a fixed position determined by a pilot part of the forming tool and is thus accurately located relative to the spindles. The work holder carries the workpiece along in fixed relation to the spindles to a discharge point where it is discharged positively from the workholder.

Positive feed means to the work holder is also provided. This means includes a device adapted to feed a single workpiece to the work holder each time an individual clamp approaches the loading point. Also included in the feed mechanism is a device to keep the flow of workpiece blanks constantly full and under pressure in order that the flow may be uninterrupted.

The following more specific description will be made with reference to the drawings and will pertain particularly to the machine as set up to thread nuts. It is not my purpose, however, so to limit my invention as will be made clear by the subsequent description of some alternative uses.

With reference to the drawings throughout which like reference characters are used to designate like parts, I have used the character 10 to designate the base on which the machine is mounted. A main drive motor 11 is mounted at one end of the base and is connected to the machine by a suitable coupling 12. The supporting structure for the machine includes end standards 13 which comprise not only end supports for the machine but also housings for the gear drives and certain auxiliary equipment as will appear later. Auxiliary supports 14 for the center section are mounted on the base and are braced longitudinally of the machine by the bars 15. The supports 14 are merely legs carrying guide members 9 whose formation and function will be described hereinafter, particularly in connection with the oil flow. When the machine is in operation, covers (not shown) may be provided supported in part by these tie bars. The front apron 16 is a part of this system of covers.

Figure 2:
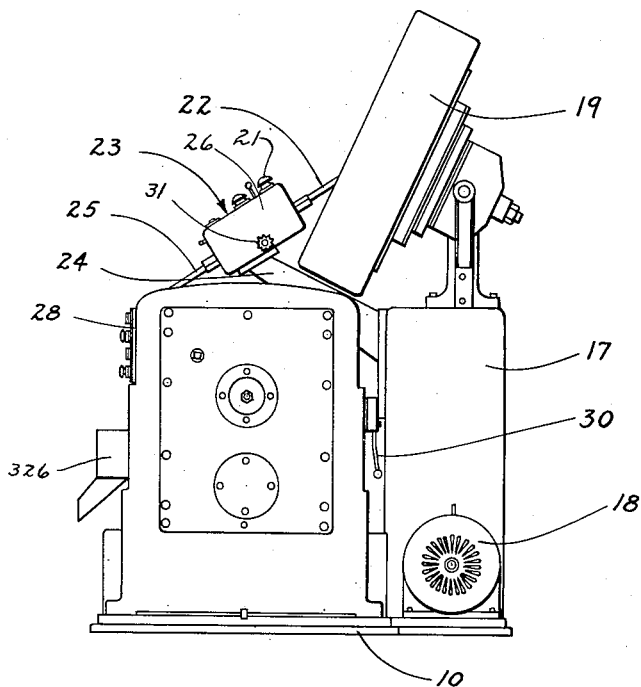
Fig. 2 is a side elevational view from the right hand side of Fig. 1.

At the rear of the machine, as best shown in Fig. 2 may be mounted an auxiliary housing 17 for such equipment as cutting fluid filters and cleaners and the like.

The motor 18 illustrated in Fig. 2 is used to drive the pump for the cutting fluid which is of any desired commercial type and is also enclosed in the housing 17. A commercial nut hopper mechanism 19 driven by a motor 20 is also mounted on the housing 17. This hopper is of such size and speed that it will deliver nut blanks to the chute 22 at a rate faster than the machine can handle them. This insures that the feed mechanism is always full and ready to feed a new piece into the carrier as will be described.

Further means to assure this condition are embodied in a feed control mechanism 23 which may be mounted on a bracket 24 supported from the housing 17. This mechanism is adapted to keep the stream of blanks in the outlet chute 25 therefrom continuously under pressure. As will be explained hereinafter, a safety device is incorporated in this mechanism to shut down the machine should the stream of blanks be interrupted for any reason. A drive motor (not shown) for this control is preferably mounted in the housing 17 and drives the device through a chain 27.

Electrical controls for the main drive motor 11 and the hopper motor 20 are mounted in small separate switch boxes 28 on the front of the machine. These contain the usual stop and start switches and signal lamps and are conventional in the art. Separate controls 21 for the feed control 23 are provided in one cover 29 of the device. This cover 29 as well as the cover 26 on the other side are held onto the device by knurled nuts 31 threaded onto studs 32 in the feed control housing. A mechanical control operated from either the front or rear of the machine by the handles 30 is also provided to engage or disengage the machine from driving engagement with its drive motor 11,

Driving mechanism

Figure 3:
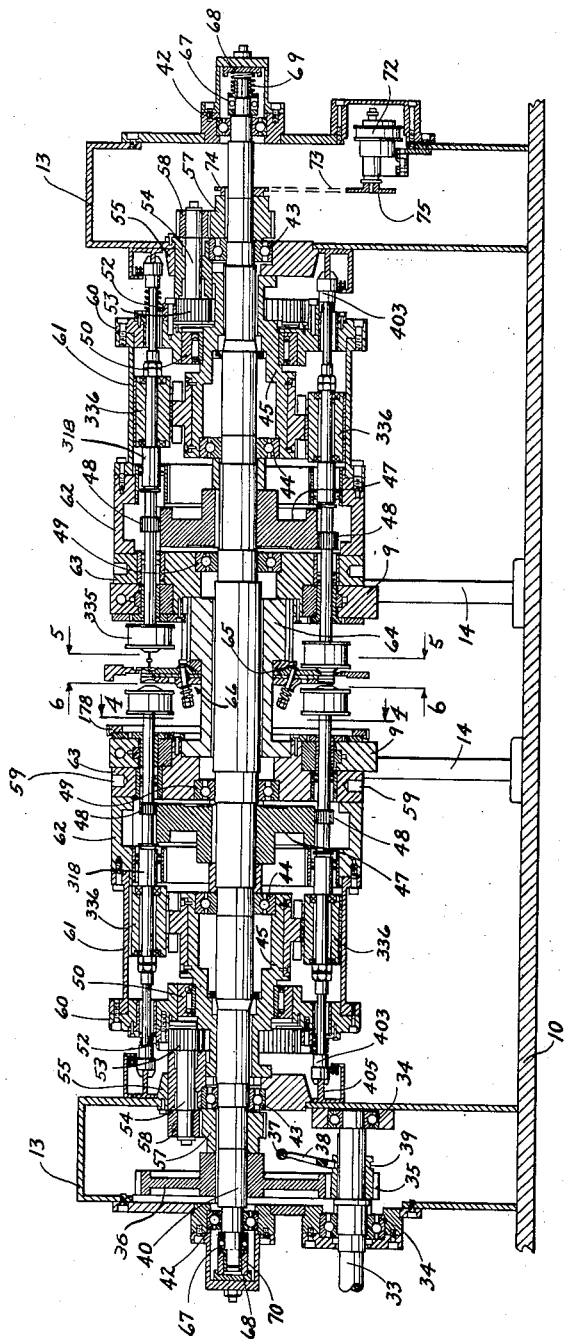
Fig. 3 is a longitudinal medial sectional view through the machine.

The main drive of the machine is from the motor 11, as noted above, through the coupling 12 to the shaft 33. As is best shown in Fig. 3, this shaft is journalled, preferably in ball bearings 34, in the left hand standard 13. A pinion 35 is mounted on the shaft 33 and is keyed thereto. This pinion is adapted to be slide on its shaft into or out of engagement with the gear 36 by the lever 30 through a shifting mechanism. This mechanism is a simple fork shifting arrangement actuated by the handles 30 which move a shaft 37 to which is fixed a shifting fork 38. This fork engages a groove 39 in a collar on the pinion 35 in a manner well known in the art and thus is adapted to shift the pinion into and out of driving engagement with the gear 36.

The drive from the pinion is normally transmitted to the gear 36 and thence to the main drive shaft 40. The shaft 40 is journalled near its end in end bearings 42 in the outer walls of both standards 13 and also in near-end bearings 43 in the inner walls. Still further support is provided approximately midway between the center of the shaft and both ends by near-center bearings 44 mounted in central stationary members 45. These latter members are bolted or otherwise suitably mounted on the inner walls of the standards 13 at both ends. Thus the shaft is supported by six bearings. Firm support such as this is necessary because the shaft is the sole support of nearly all of the operating mechanism of the machine. Furthermore, such support will help to prevent whipping of the long shaft. A thrust bearing 67 is provided at each end of the shaft. Adjustable cupped members 68 are fixed to the standards 13 and on one end adjust the compressive force of a spring 69. A spacer 70 is substituted for the spring 69 on the other end, but in other respects the devices on both ends are the same.

A pair of large "bull" or sun gears 47 are keyed to the shaft adjacent to and inboard of the near center bearings 44. These gears are the sun gears for two symmetrical planetary gear systems formed by the planetary pinions 48 carried about the sun gears 47 by an irregular shaped drum supported partly on the shaft by center bearings 49 and partly on the stationary members 45 by roller bearings 50. This drum is driven from both ends through internal ring gears 52, driven by pinions 53. The pinions 53 in turn are keyed to similar countershafts 54 journalled in bearing brackets 55 mounted on the inner wall of the standards 13. These countershafts 54 are driven by the main shaft 40 through gears 57 keyed to the main shaft and meshing with gears 58 on the countershafts 54.

The main drum is substantially symmetrical end-for-end, except directly at its center. The ring gears 52 are mounted on end plates 60 which also support the roller bearings 50. These end plates 60 are connected to the rest of the drum by cover members 61 which may conveniently be bolted to the end plates 60 and to the spindle supporting members 62. The complete function of these covers will be more fully described hereinafter. The spindle supporting members 62 are fastened to inner wall members 63 on both sides of the center section of the machine. Holes 59 may be provided in the end member 63 into which a bar may be inserted for turning the machine by hand if desired. The wall members 63 hold the center bearings 49 and so help to support the drum. A center hub 64 joins the wall members from both sides and completes the basic structure of the rotating drum. The hub 64 is the only part of the drum assembly which is not symmetrical, being formed with a shoulder 65 to which the face plate and clamping or work-holding mechanism 66 is fastened as described hereinafter. A second spindle support member 71 (Fig. 15) may be bolted or otherwise fastened to the wall members 63 on each drum, and a cover plate 76 used to cover the complete end of the assembly. The cover 76 and spindle support 71 slide freely relative to the guide member 9 and are formed particularly for the purpose of providing proper lubrication and flushing of chips as will be explained hereinafter.

A small oil pump 72 may be mounted in one of the end supports 13 to provide lubrication for the gears and bearings in that support. The pump is driven by a chain 73 engaged with a sprocket 74 on the main shaft and driving a sprocket 75 on the pump shaft. A sump may be formed in the base of the support to catch the oil and supply it to the intake side of the pump 72.

Nut injecting mechanism

Figure 1:
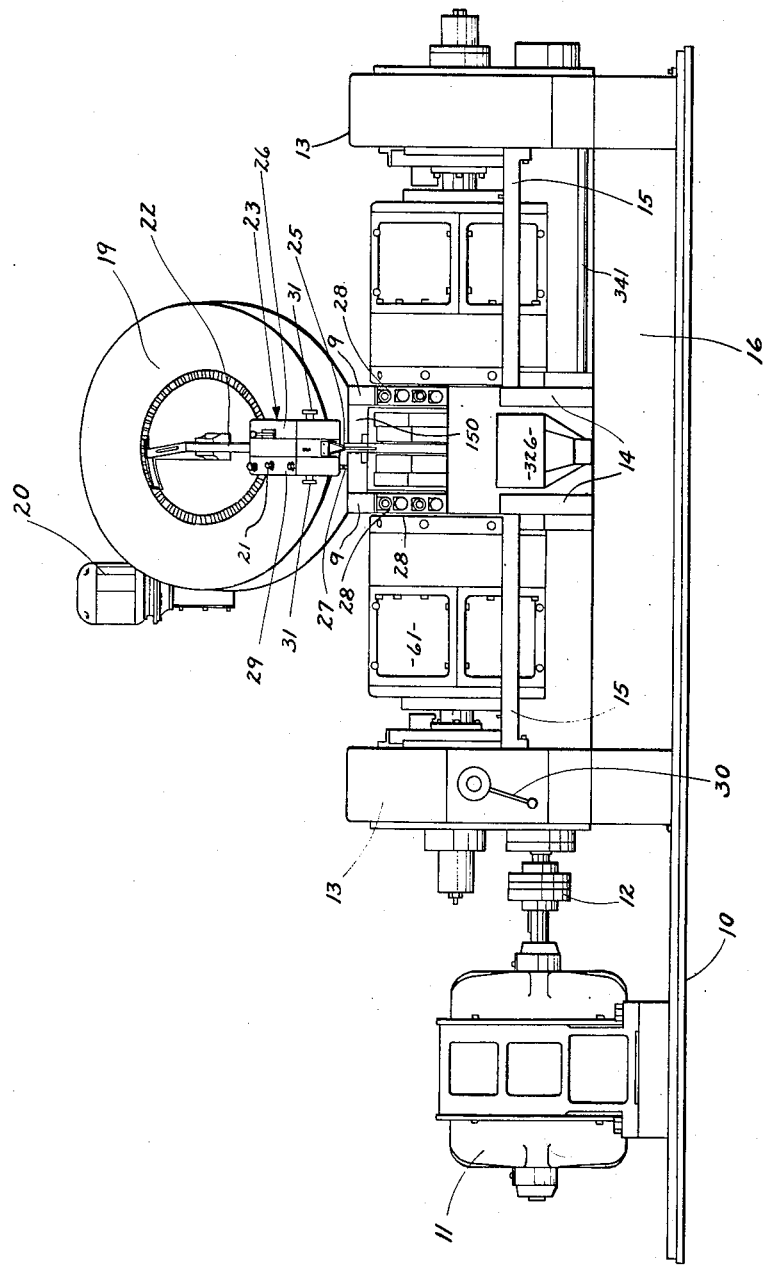
Fig. 1 is a front elevational view of the machine with the covers removed.

As the nut blanks leave the feed control device 23 (Figs. 1 and 2), they pass through the chute 25 into an injector device which provides positive injection of one nut blank into each receptacle in the clamping device 66 as it passes. This injector device is mounted on an arcuate support 148 (Fig. 5) which also supports a device to carry away completed nuts and various other auxiliary equipment at the center part of the machine. As previously stated, the center supports 14, which are disposed in spaced longitudinal relation at the center of the machine, carry generally rectangular plates forming the guide member 9 as can best be seen in Figs. 3 and 4. These plates are also disposed in longitudinally spaced parallel relation. The upper edges of the member 9 have secured thereto in bridging relation a bar 150 which can be seen in Figs. 4, 5 and 6. The support 148 is carried on the frame at its upper and lower portions. At the lower edge it is mounted to a longitudinal member 149 which likewise bridges and is carried by the guide members 9, being fastened to these members near the bottom of their front vertical edges. At its top, the support is fixed to the bar 150 (Fig. 1). The bottom of the member 148 is held against lateral movement by an adjustable bolt 146 (Fig. 14) threaded through the support 148 and having a head adapted to engage one of the guide members 9. An elongated nut 147 at the threaded end engages the opposite guide member 9 to allow the support to be adjusted to the proper position in a manner similar to opposed screw jacks. As noted above, the nut injector is fixed to the support 148. The drive for the injector device is also supported in part from the top longitudinal bar member 150.

The nut blanks are guided by the chute 25 to an inlet guide 152 which has a cover 153. As best shown in Fig. 8 where the cover 153 has been removed, the guide rotates the nut blank and sets it up on edge. An observation slot 156 may be left between the cover 153 and the inlet guide 152 if desired to watch the progress of the blanks. From this guide, the nut blank enters a movable entry member 154. This member is formed with a slot 155 for the nuts which is also covered by the cover 153. It is pivoted to the supporting frame 157 of the injector by a screw 158. A spring 159 engaged between the member 154 and the framework 157 biases the member 154 to the position shown. A lip 160 guides the blanks to their proper position over the slot 161. A ram 163 movable vertically (Figs. 7 and 9) normally retracts, receives the nut, and forces it downward in the slot 161 formed in the injector. However, on rare occasions, it may catch the blank 162 as shown in Fig. 8. In this event, the member 154 pivots against the force of the spring 159 and prevents damage to the machine or to the blank. On the next successive stroke, the nut will almost invariably find its way into the channel 161 and pass through the machine. The motion of this member 154 may be utilized to operate a shut down switch (not shown) by forming a vane 164 on the member and mounting the switch in position to be operated thereby. This has been discovered to be an unnecessary precaution, but might be useful in some cases.

Figure 6:
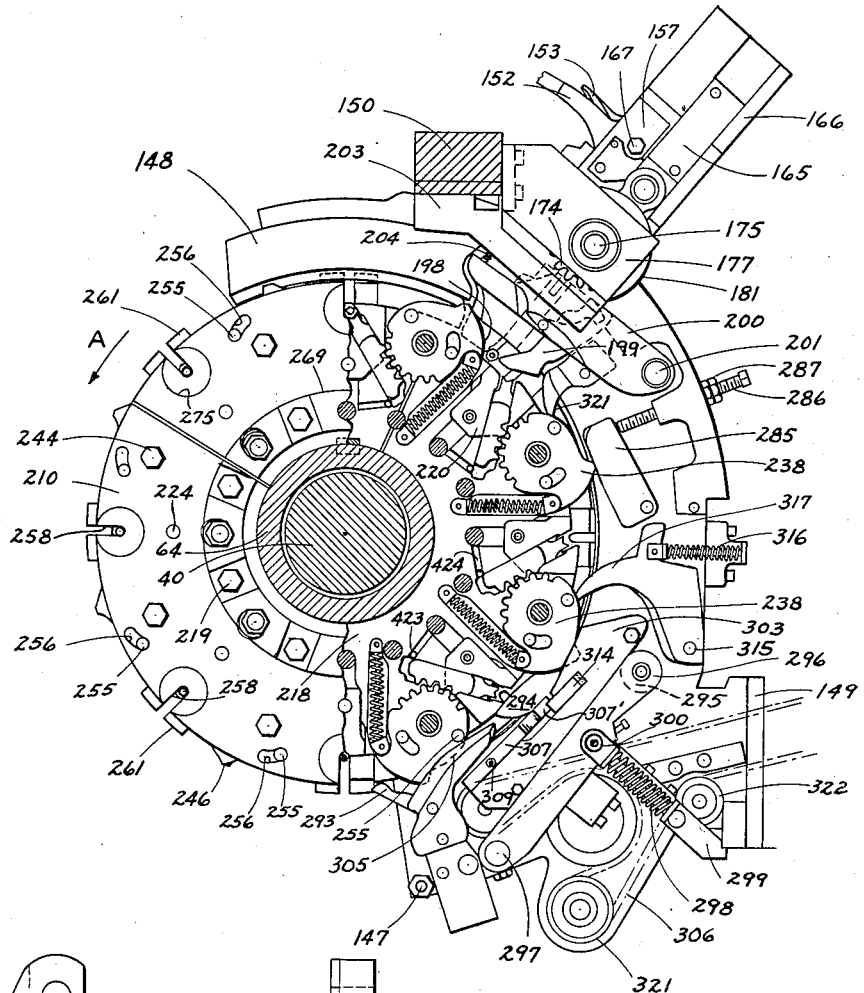
Fig. 6 is an enlarged sectional view taken along line 6—6 of Fig. 3.
Figure 9:
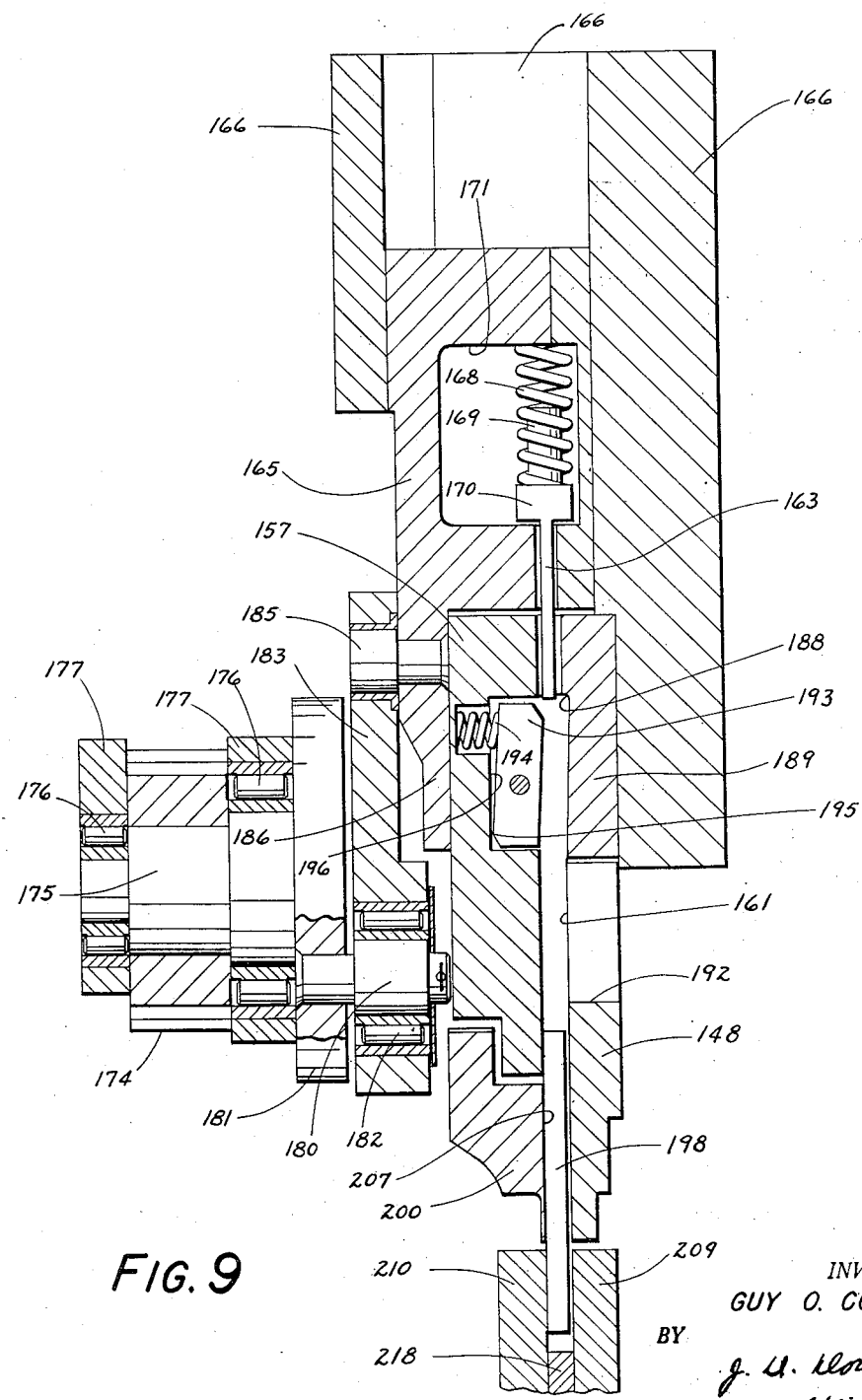
Fig. 9 is a sectional view taken on line 9—9 of Fig. 7, drawn to an enlarged scale.
Figure 13:
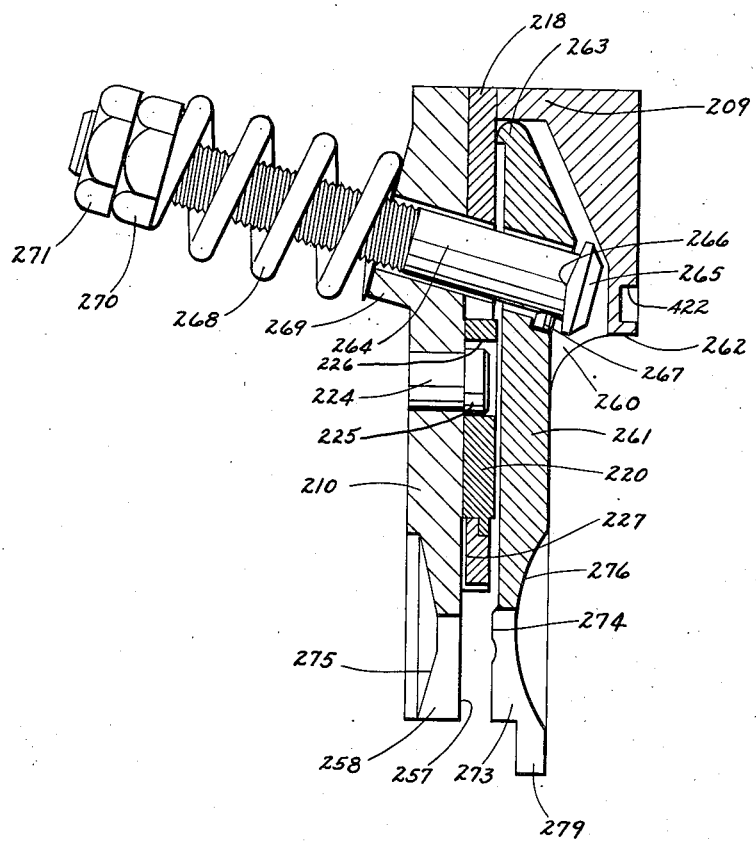
Fig. 13 is a radial sectional view through the centerline of the clamp mechanism.

The ram 163 is carried by a slide block 165 slidably guided by a guide 166 (Figs. 6 and 9). The guide 166 may be bolted to the frame 157 by a bolt 167 as shown in Fig. 6 and be aligned by dowels or the like, not shown. The ram 163 is slidable in the block 165 and is urged downward by a compression spring 168 disposed over a stud 169 formed on the ram upwards of a collar 170. The spring 168 abuts the top wall 171 of an opening in the block 165. Because of the shape of the ram 163, it is desirable that the block 165 be formed of two pieces as shown (Fig. 9) in order to facilitate assembly as will be apparent to those skilled in the art.

The block 165 is reciprocated in timed relation to the rotation of the main drive members by a gear and crank mechanism best shown in Figs. 6 and 9. A pinion 174 is keyed to a shaft 175 which is journalled in roller bearing 176 between two arms 177 of a yoke attached to the support member 150. This pinion is meshed with a ring gear 178 (Figs. 3 and 4) fixed to the cover plate 76 of the spindle carrier by screws 179. The gear ratio between the ring gear 178 and pinion 174 will depend on the number of spindles in the machine, the ratio being such that the pinion makes one full revolution during the passage of the space between two adjacent spindles. In the present embodiment, having eight spindles, the ratio is eight to one. An eccentric 180 is staked into a disk 181 formed on the end of the shaft 175. This pin extends from the disk and is journalled in a roller bearing 182 mounted in a crank arm 183. The arm 183 is journalled at its other end on a pin 185 staked into a depending flange 186 of the block 165. Thus the ram 163 carried by the block 165 reciprocates through a complete up and down cycle each time a spindle passes. As noted, each time the ram is withdrawn upward, another blank is pushed into the slot 161 because of pressure on the stream of nuts above imposed by the feed control device. At each down stroke of the ram, then, the string of nuts enclosed in the channel 161 will be moved down to inject the last nut into the clamping ring 166.

In order to prevent the row of nuts in the slot 161 from following the ram 163 on its back or upward stroke, a shoulder 188 (Fig. 9) is formed in the cover 189 for the slot 161. This cover, which has been removed in Fig. 12 to show underlying parts, may conveniently be held by screws driven into the tapped holes 191 in the frame work 157. The cover may also extend over and cover the spring 159. An observation slot 192 is cut through the support 148 and opens into the slot 161 to observe the passage of the nuts if desired. A spring pressed pad 193 is pinned to the framework 157 in the wall of the slot 161 opposite the shoulder 188 (Fig. 9). A spring 194 disposed in a hole in the frame urges the pad to the position shown in Fig. 9. The movement of the pad is limited by the engagement of its lower edge 195 with the wall of the recess 196 in which the pad is disposed. However, the movement of the pad 193 is sufficient to push each successive nut blank under the shoulder 188 to prevent it from returning upward with the ram 163. In addition to holding the nut under the shoulder, the pad 193 by its motion breaks any bond between the blank and the ram which might be caused by oil or the like on the meeting surfaces. When the machine is in full operation, the slot 161 is completely full of blanks and, therefore, each new one which is pushed under the shoulder 188 by the ram 163 causes a blank to be injected into the machine.

Between injection strokes, the blank at the bottom of the channel 161 is held between two fingers 198 and 199 (Fig. 7A). The finger 198 is formed as a part of a movable piece 200 pivoted to the support 148 at 201. The piece 200 is biased toward the center of the machine by a spring 202 having an end fitting 203 at one end seated in a socket in the piece 200, and the other end seated in a hole 204 formed in a flange 205 of the support member 148. A continuation 207 of the slot 161 is formed in this piece and is closed by the support 148 so that the channel for the nuts is substantially continuous. Motion of a blank along its axis as it passes out of the slot 207 toward the end of the fingers 198 and 199 is prevented by a spider plate 209 and a face plate 210 disposed on opposite sides of the fingers 198 and 199. These plates are a part of the face plate and clamping or work carrying mechanism 66 (Fig. 9).

The second finger 199 is movably disposed in a hollow 211 in the piece 200 and pivots about the pin 212 (Fig. 7A). A compression spring 213 engages a wall of the hollow 211 and the outer end 214 of the finger 199 and thus biases the end of the finger 199 toward the opposite finger 198. At its lower end, the finger 199 is formed with a flat surface 215 slanting at an angle of approximately 60 degrees so as to engage the flat surface of the nut blanks as they come down the channel. In Fig. 7 the blank has been pushed beyond the end of the finger 199 and the face 215 is ready to engage the next succeeding blanks when the lower blank is eventually removed by mechanism 66, as hereinafter described. Between injection strokes, the lowest nut blank is held between the fingers 198 and 199 as shown in Fig. 7A. A slight dimple 216 may preferably be formed in the finger 198 to hold the nuts in place until action of the ram 163 forces them out of the channel. It will also be noted that the hollow or relieved part 211 extends beyond the finger 199 toward the pivot point to provide clearance for a hook 321 whose purpose will be made clear hereinafter.

*Work carrying mechanism*

The work carrying mechanism 66 as noted above is carried by the central hub member 64 and therefore rotates in unison with the spindle carrying drum. The primary structure of the mechanism 66 is formed of three plates; the spider plate 209, the face plate 210, and, between these two plates, a carrier plate 218. Reference may be had to Fig. 31 which shows an enlarged section of this mechanism, although it must be borne in mind that the construction of the hub member 64 departs from that shown in Fig. 3, this being a modification. These plates are each made in two segments so that they can be assembled on the hub member 64 and are fastened to the hub by cap screws 219 (Fig. 6). The plates thus are rotated in the direction of the arrow A (Figs. 5, 6 and 10) by the hub member.

Most of the working mechanism of the work holder is carried between the face plate 210 and the spider 209. This mechanism is designed not only to prevent the nut from rotating while it is being threaded, but also to assure perfect alignment of the nut with the threading tool, both as to the hole in the blank and as to the centerline of the threads being normal to the face of the nut. The mechanism also provides positive means of ejection of the nut from the clamp and provisions to prevent jamming of the nuts at the high speeds at which the machine can be operated.

Figure 5:
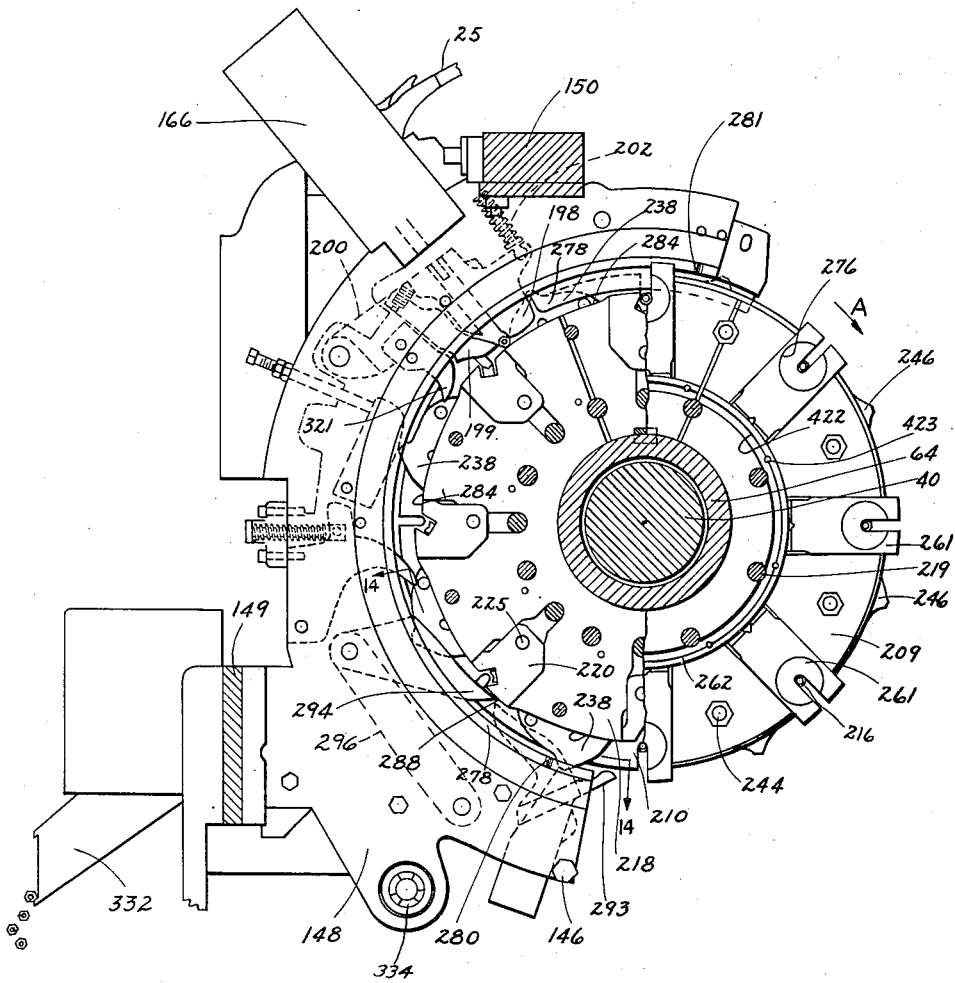
Fig. 5 is an enlarged sectional view taken along line 5—5 of Fig. 3.

The carrier plate 218 is formed to provide openings 223 in which the wrench members 220 are disposed (Figs. 5 and 10). A pin 224 pressed into the face plate 210 (Fig. 12) has a head 225 extending into a slotted opening 226 in the wrench. Thus the wrench is free to move slightly in a radial direction. A pusher bar 227 is slidably disposed in a relief 228 in the wrench 220, and has an end 230 formed the full thickness of the wrench member adapted to move in a slot 229 in the wrench. This end 230 is formed to receive two adjacent sides of the nut so that the wrench actually will engage four sides of a hexagonal nut, for example.

The pusher bar 227 is adapted to be moved by a rack 232. This movement is transmitted by the engagement of a flange 233 on the pusher 227 in a slot 234 formed in the rack member (Fig. 11). The slot 234 is somewhat loose on the flange 233 to allow the pusher 227 to follow the wrench 220 in its slight radial movement previously mentioned, while the rack retains its position. The rack member itself is slidably disposed in a channel formed by matching reliefs 235 and 236 in the liner 218 and face plate 210 respectively (Figs. 10 and 12). Movement of the rack is induced by a gear member 238 having teeth 239 partially around its periphery and meshed with the teeth 240 of the rack. This gear 238 is journalled on a brass bushing 242 surrounding a bolt 243 extending through the three plates and having a nut 244 on each end. The gear is disposed wholly within a relief 245 in the face plate 210 which is covered by the surface of the carrier plate. Thus the gear 238 is displaced slightly from the plane in which the pusher 227 operates, and in which the nut blanks are inserted into the wrench. The gear member 238 is moved by engagement of a follower portion 246 formed on its periphery with either of various cam members fixed to the support 148 and which will be described later. This movement is resisted by a spring 247 fitted with end members 248 engaging the face plate 210 and carrier plate 218 at one end and an ear 249 on the gear member at the other end. The spring is disposed in a channel formed by relief grooves 250 and 251 in the face plate and liner respectively (Fig. 12). A pin 253 pressed into the face plate 210 and extending through an arcuate slot 254 in the gear member 238 forms a stop member to limit the motion of the gear. A second pin 255 extends upward from the gear member through a slot 256 in the face plate (Fig. 6) and beyond to provide follower means for a camming action to help the spring return the gear to its normal position as will later appear.

As noted above, the nut as it comes from the injector channel slides between the inner surfaces of the face plate 210 and spider 209. The surface 257 (Fig. 15) of the face plate is a smooth flat and continuous surface broken only by radial slots 258 just wide enough to clear the threading tool as it passes through the nut. This surface 257 is accurately formed so that when the work carrying assembly 66 is fixed to the drum member 64, the surface is normal to the center line of the machine within very small tolerances. This insures that one face of the nut will be normal to the centerline of the tapping tool.

Figure 15:
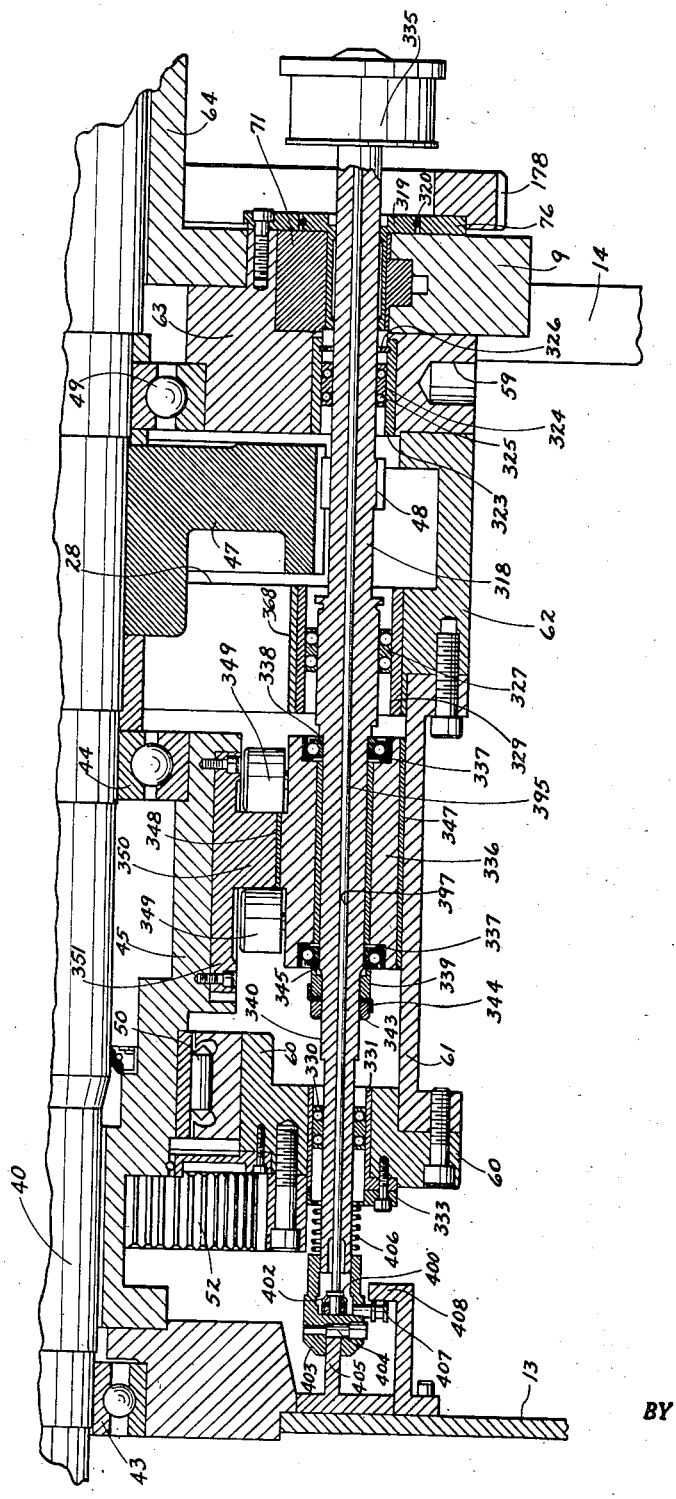
Fig. 15 is an enlarged sectional view of the spindle drive mechanism.

The spider plate 209 is formed with openings 260 (Fig. 5) substantially radially of the plate in which are disposed clamp members 261. A hub 262 is formed at the center of the spider and the opening 260 is cut into but not through this hub (Fig. 15). The clamp member 261 extends into the opening in the hub and at the inner end is formed with a fulcrum 263 adapted to press against the carrier plate 218. The clamp is pulled toward the face and carrier plates 210 and 218 by a bolt 264 extending through the clamp, carrier and face plate. This bolt has a special head 265 adapted to ease the rocking action of the clamp. The surface of the head engaging the clamp is formed with a V-shape so that only the apex 266 of the V engages the clamp. A small pin 267 carried by the bolt 264 and engaged in a slot in the clamp 261 prevents the bolt from becoming misaligned and therefore insures that the apex 266 is always in the proper line for the clamp to rock thereon. A spring 268 engaged between a hub 269 on the face plate and a nut 270 on the bolt 264 holds the clamp normally closed. A jam nut 271 may be used to prevent movement of the nut 270. The spring is preferably quite heavy and is prestressed to assure that the clamp will be held in its closed position at all times except when forcibly opened. A slot 273 similar to the slot 258 is formed in the face plate at the clamping end. However, instead of a smooth flat surface as on the face plate, it is preferred that a slight transverse ridge 274 be formed on the inner surface of the clamp by cutting a groove into the base of the clamp. This ridge engages the nut blank approximately at a centerline and assures that the blank will be lined up by the face plate which is a fixed surface instead of the clamp which moves and might be out of line because of the differences in the thickness of the blanks. The face plate 210 and clamp 261 both have hollows 275 and 276 respectively at the edge opposite the slots to provide clearance for the spindle heads later to be described.

In order to inject or eject a nut from the clamp, it is necessary that it be opened by external means. This may conveniently take the form of a cam ring 278 (Fig. 5) formed on the support 148. This ring extends along the inner side of a lip 279 on the clamp member 261 and is formed with a rise at 280 at its lower end (Fig. 5) which serves to spread the clamp member away from the face plate. The cam ring 278 is in reality only a continuation of the support 148 and is formed with varying thickness to operate the clamp. The rise 280 is located so that the nut may be ejected at the proper time, and the clamp 261 is held open by the ring 278 until it reaches a fall at 281 somewhat beyond the point where the nut is injected, for a reason to be made clear hereinafter.

During a cycle of rotation of the clamp and wrench mechanism a series of events takes place. As noted above, rotation of the plates is in the direction of the arrow A. As the nut is injected, it is pressed onto the outer edge surface 284 of the carrier plate (Fig. 10). It is held there in spring pressed engagement by the spring 168 on the ram of the injector through the train of nuts in the channel 161. As the plates move around, beneath the nut, an adjustable cam 285 (Figs. 6 and 10) engages the follower part 246 of the gear member 238 and rotates the gear, pushing the pusher bar 227 up to a position where one surface of the end 230 is substantially in line with the outer edge 284 of the carrier plate and the corresponding surface of the wrench 220, as best seen in Fig. 10. The cam 285 may be adjusted by a screw 286 which is locked by a jam nut 287, so that this alignment can be established and maintained. The nut then slides smoothly into the end of the pusher, while the finger 199 of the injector just clears the upper edge surface 288 of the wrench (Figs. 7 and 10).

As soon as the blank is in the end of the pusher, the follower 246 is disengaged from the cam 285, and the spring 247 reverses the motion of the gear 238, thus retracting the pusher. The nut may then fall into the wrench. However, this is not a positive movement as may be necessary, and, therefore, the finger 198 is long enough to engage the nut and push it into the wrench. A rounded corner 289 on the finger aids this operation. A downwardly extending rib 291 on the support 148 and having an inner surface concentric with the carrier plate 218 extends close to the wrench 220 and opposes the tendency of the nut blanks to come out of the wrench because of the centrifugal force on the blank. As noted above, the finger 198 is a part of the movable piece 200 and is therefore adapted to slide upward on the side of the nut blank should it not recede quickly enough. However, the finger is purposely made broad in the direction of travel of the plates so that should the finger ride up in such manner, the pressure of the spring 202 on the piece 200 added to that of spring 247 on the gear will surely cause full retraction. As the finger 198 passes over the nut, the corner 289 strikes a rounded corner 290 formed on the wrench which cams the finger up over the surface 288. This impact is quite hard, and it is considered possible and perhaps even desirable, although not necessary, that a crank device operated from the ring gear 178 similar to the nut injector could be used to raise the finger 198 in timed relation to the passage of the wrench to avoid the impact.

As the nut is carried beyond the finger 198, it is fully retracted into the wrench. It will be recognized that the pusher mechanism may not be essential, and that a nut could be inserted into the wrench without such mechanism. In this case, the wrench would be formed with an opening similar to the shape of the present wrench with the pusher retracted. However, it has been found that there is considerable tendency for a nut blank pressed onto the surface 284 to roll into the wrench rather than to slide. When such rolling occurs, a few of the blanks are caught by the wrench across their corners instead of across thin flat faces. This jams the machine and, in view of the speed at which the machine may be operated, such jamming might very well result in breakage of parts. The movement of a flat surface in line with the edge 289 strongly deters such rolling so that all the nuts may be retracted properly into the wrench.

The clamp 261 is held open during the entire injection process as described, by the cam ring 278. It is held open even beyond the full retraction of the nut. During this next succeeding period, the threading tool is inserted through the slots 273 and 258 in the clamp and face plate respectively and through the central hole in the nut blank. The mechanism to accomplish this will be described hereinafter as will the formation of the tool which causes the insertion to line up the hole. Suffice it to say that, by the insertion of the tool into the hole in the blank, the nut, along with the wrench which is free for limited radial movement as noted above, may be moved slightly. As soon as the nut is aligned, however, the clamp 261 is allowed to close because of the fall 281 of the cam, and the blank is then clamped securely against the face plate 210 and held from rotation by the wrench 220. Just beyond this point the work holder member 66 carries the blank beyond the end of the rib 291.

Figure 14:
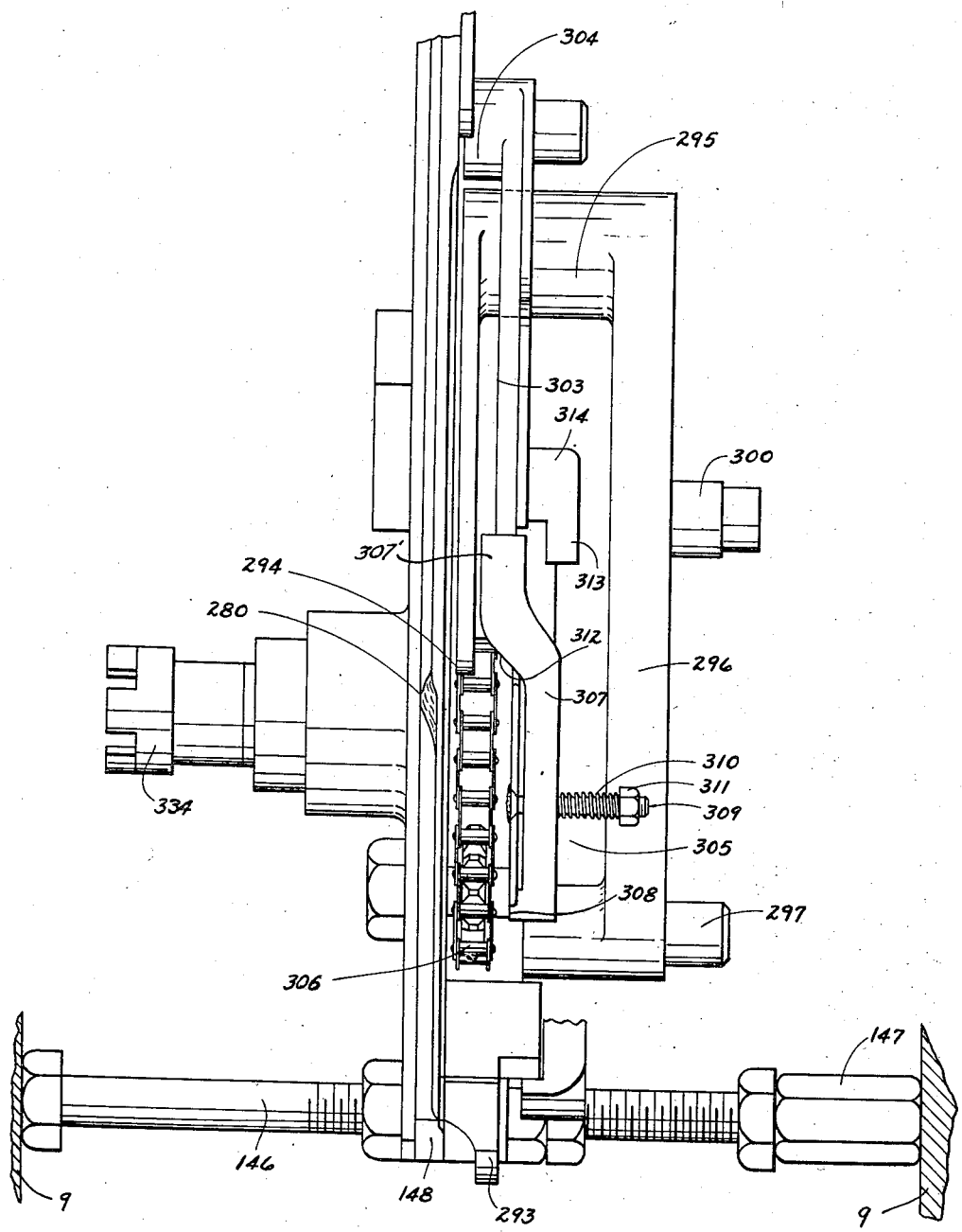
Fig. 14 is a view of the discharge mechanism from the periphery of the work-holding mechanism on line 14—14 of Fig. 5.

During the next period of motion of approximately 180 degrees of the plates, the threading tool is driven through the blank by mechanism hereinafter described. However, as the blank reaches the bottom of the machine (Figs. 5 and 6), the clamp 261 again engages the rise 280 of the cam 278 and is opened. At this point, the nut is free to fall out or be thrown out of the wrench by centrifugal force onto a discharge mechanism which removes the completed nuts. However, in order to get a positive discharge, a second cam 293 is mounted on the support 148 to move the pusher bar 227 outward from the center of the plates and force the nut out of the wrench. Since the exact final location of the pusher is not of great importance here, no adjustment is provided. In order to assure that no nuts are carried beyond this station, a stripper 294 in the plane of the wrench extends almost to the outer surface 288 thereof to strip off any nuts and also any metal chips which may be carried along in the process. The stripper 294 is mounted on a spacer 295 at one end of a long arm 296 pivotally mounted to the support member 148 at 297 (Fig. 6 and 14). A spring 298 engaged between a boss 299 mounted on the plate 149 and a fitting 300 on the arm 296 urges the stripper to an inward position towards the center of the plates. Inward motion of the arm 296 may be prevented, however, by engagement of the spacer 295 with a plate 303 fixed to the support 148 but spaced therefrom by a boss 304 so that the stripper may extend between the plate 303 and the support 148. It will be apparent that other stop means might be used to hold this stripper and arm and prevent their movement beyond certain limits. A rounded corner on the stripper allows it to ride up on the corner 290 of the wrench and effectively clear the edge surface 288.

As the wrench 220 passes the stripper 294, the cam 293 releases the follower 246 and the pusher is free to recede. However, at this station, there may be chips or the like interfering with free movement of the pusher and, therefore, a cam 305 is provided which lies just beyond the outer surface of the face plate 210. As noted above, pins 255 extend through arcuate slots 256 in the face plate far enough to be engaged by the cam 305. This engagement serves to return the gear 238 and also the rack 232 and pusher 227 to their normal retracted position (Fig. 6).

Figure 6A:
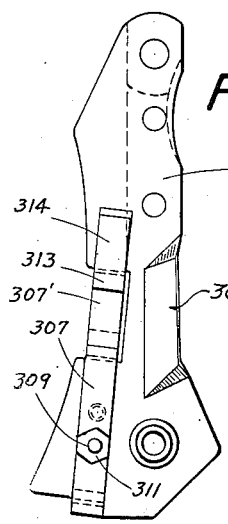
Fig. 6A is a side elevational view of the lateral stripper device removed from the machine.
Figure 6B:
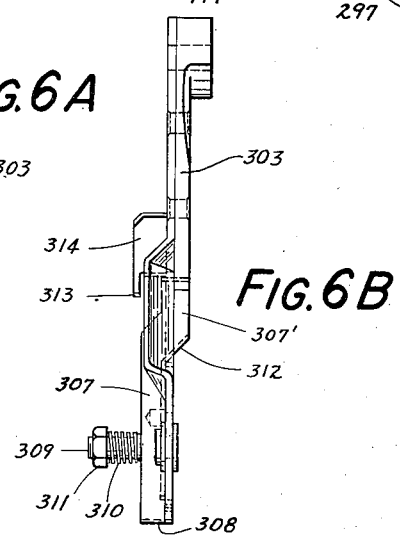
Fig. 6B is an edge plan view of the device of Fig. 6A.

Further movement of the plates causes the follower part 246 to be carried under a lateral stripper bar 307 (Figs. 6A, 6B and 14). This bar is fulcrumed on the plate 303 at 308 and is slidable freely on a stud 309 on that plate. A spring 310 engaged between a nut 311 on the stud 309 and the bar 307 serves to press the bar always towards the plates. However, the follower part 246 engages the sloping surface 312 and pushes the bar outwards against the spring 310. Outward movement is limited by an overhanging lip 313 on a boss 314 on the plate 303. As soon as the follower part 246 is past, the bar 307 snaps back to its original position as shown in Figs. 6B and 14, and in this position it keeps the edges of the plates adjacent the follower part 246 clear of chips and the like, and also will knock down any nuts which happen to be carried around past the stripper 294. It will be noted that the end 307′ (Figs. 6 and 14) lies adjacent this stripper. Actually, the end 307′ may rest against the stripper member 294 until the extending part 246 of the gear passes it. The radial position of the end 307′ is just beyond the edge of the face plate 210 but close enough thereto to prevent a nut from passing between the face plate and the end 307′ of the bar 307.

As the wrench is carried around still further, it passes two clearing hooks. The first hook 317 (Fig. 6) is pivoted to the support 148 at 315 and is urged toward the plates by a spring 316. The spring 316 is fastened to the hook 317 and the support 148 by suitable end fastenings in any preferred manner well known in the art. The second hook 321 (Figs. 5, 6 and 10) may be riveted to the support 148. The pivoted hook 317 is spring loaded merely as a precautionary measure, and it might also be riveted to the support with little or no likelihood of damage ever occurring to the machine according to observations. Thus, these hooks extend adjacent the wrenches 220 and serve to catch dirt, chips and the like as the plates rotate.

I have described only one wrench assembly. This assembly is duplicated around the plate eight times at equal spacing in the embodiment shown. More or fewer assemblies also could be used depending on the size of the machine and of the individual wrenches. However, in case more or fewer were used, the gear ratio between the ring gear and injector pinion would have to be changed and timed accordingly.

As the nuts are pushed out of the wrenches 220, they fall on a chain 306 (Figs. 6 and 14) engaged over sprockets 321 and drums 322 in any desired manner to deliver the nuts to an outlet chute 332. The chain may be driven by the lowermost sprocket 321 which in turn is driven through a coupling 334 by a shaft 341 extending from the left hand end (Fig. 1) of the machine. This shaft may be driven by the chain 73 engaging the sprocket in a manner well known in the art.

*Spindles*

As noted above, the eight spindles on each side of the present embodiment are driven by the meshing engagement of the bull gears 47 with the pinion 48 on the spindles (Figs. 3 and 15). Each of the spindles is adapted for longitudinal as well as rotary motion, thus being adapted to carry driving heads which drive a tool in a rotary motion while feeding it through a nut blank, and then following discharge of the finished nut, the heads carried by the spindles return the tool to its original position. It will be apparent that, while the shaft 40 is rotating in one direction, the spindle carrying drum device will be driven in the opposite direction because of the internal gear drive at the ends of the drum. Thus, the pinions 48 are carried around the bull gears 47 in a planetary manner and consequently are driven at a comparatively high speed. The pinions 48 may be formed as a part of the spindle 318 itself or may be suitably fixed thereto. It will be apparent that the direction of rotation of any or all of the spindles could be reversed by use of an idler gear between the pinion 48 and the bull gear 47. This might be useful in an operation where it was desired that the spindle on one side rotate in a direction opposite to that of the spindles on the other side. As best shown in Fig. 15, the spindle 318 extends through four of the individual members of the rotating drum. At its right hand end in that figure, the spindle is journalled in a bronze bearing bushing 319 pressed into the support member 71. Suitable packing 320 is provided between the cover 76 and the flange of the bushing to keep dirt and chips isolated from the bearings within the drum member, and to keep cutting fluid and the like within the bushing as will appear hereinafter.

The spindle 318 next passes through the end wall member 63. At this point, a hardened steel bushing 32 is pressed into the member. The surface of the spindle adjacent this bushing is also hardened. A form of ball bearing which will journal the shaft both for rotational and longitudinal motion is provided in the space between the bushing and the spindle. This bearing is formed by a sleeve 324 made of brass or similar material and into which two or more circumferential rows of balls 325 are staked in holes formed therein. This assembly of balls and retainer is placed between the bushing 323 and the spindle shaft in that region which then act as races for the ball bearing. It is evident that, in addition to the rotary motion of a regular ball bearing, the spindle can move longitudinally, rolling the balls 325 on the bushing 323 and causing the retainer and ball assembly to move longitudinally one-half the distance moved by the spindle. The bearing is formed so that the balls are preloaded. That is, the diameter of the balls are slightly greater than the space allowed for them between the bushing 323 and the spindle 318. This preload is preferably of the order of .0003 to .0005 inch. A snap ring 326 may be provided for this bearing and may also be used for the others to hold standard oil seal rings in place if desired.

The second and third spindle bearings are similarly formed and preloaded. The second bearing 327 is located in an inwardly extending, wide flange 328 formed in the spindle support member 62. This bearing also includes a hardened bushing 329 pressed into an opening in the flange 328 as a race for the bearing. The third bearing 330 includes a bushing 331 pressed into the end plate 60 and on which the bearing may roll. A cover plate 333 may be provided at this end to protect the bearings and retain grease.

At its end nearest the center of the machine, each spindle carries a tool holding head 335 which will be described in more detail hereinafter. The pinion 48 is located between the first and second bearings 324 and 327, and the follower block 336 which controls the longitudinal movement of the spindle is located between the second and third bearings. The spindles are journalled in the follower blocks by two commercial angular contact ball bearings 337, one at each end of the block. A fixed position of the spindle relative to the block is maintained by engagement of one of the bearings with a shoulder 338 on the spindle against which the bearing is held by the pressure of a nut 339 against the other bearing. This nut is threaded on a threaded part 340 of the spindle shaft and is retained by a jam nut 343. A flanged washer 344 having portions bent over the flats of the nuts to prevent relative rotation therebetween is located between the nuts 339 and 343. The nut 339 may be partially bored out as shown (Fig. 15) to clear a shoulder 345 on the spindle.

Figure 16:
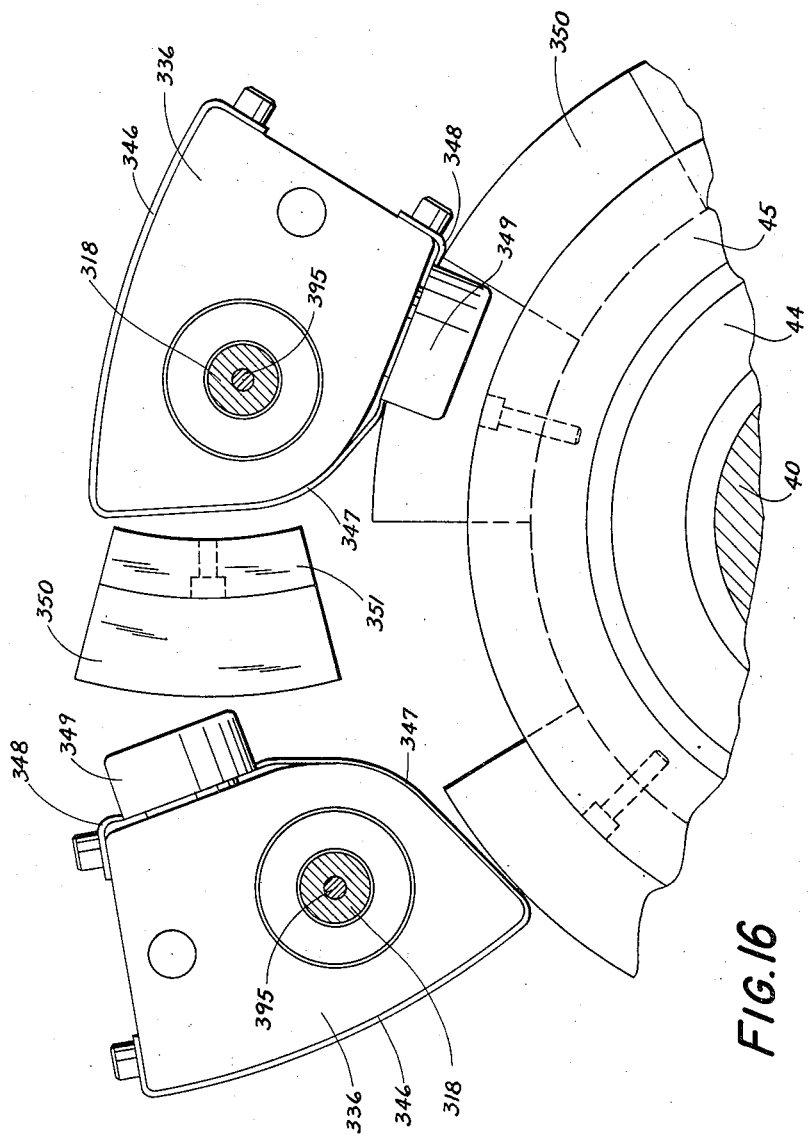
Fig. 16 is a partially exploded, end-elevational view of two of the follower blocks and a portion of the drum cam showing the method of removal of the cam segments.

As best shown in Fig. 16, the follower block 336 is an irregularly shaped block having an outer surface 346 of particylindrical form. A sheet 347 of brass or bronze or other bearing material covers this outer surface and is wrapped around the block having a tongue 348 extending between the two rollers 349 on each block. The rollers 349 may be standard antifriction bearings mounted on headed pins threaded or otherwise held in the block. They are spaced apart just far enough to straddle a cam ridge 350 formed on cam segment blocks 351 which are held in the stationary part 45 of the support for the machine. Thus, while the rollers straddle the cam ridge 350, of this drum cam, they will translate any change in the location of that ridge into longitudinal motion of the spindle. However, since the follower block is free to rotate on the spindle, it is necessary to have some means of holding it in a fixed position with the rollers engaging the ridge. This is accomplished by the engagement of the outer surface of the brass sheet 347 with the inner surface of the cover members 61 which are finished as a bearing surface for the follower blocks to slide on longitudinally. Because of their wide arcuate outer surface, the blocks are then restrained from turning about the spindles. Both the spindles 318 and the cover member 61 rotate about the center of the machine at the same speed. Therefore, the only motion between the cover 61 and the follower block is the longitudinal sliding induced by the cam.

In order to utilize the complete flexibility of the machine, it may be necessary at times to change the drum cam which controls the spindle movement. Unless this can be done without removing the spindles, the whole machine must be disassembled. Therefore, as shown in Fig. 16, the followers are designed to be moved to make possible the removal of the segments 351. This is accomplished by offsetting the rollers 349 from the spindles 318, so that the block 336 is eccentrically mounted and can rotate about the spindle when a cover 61 is removed to open a passageway through which the cam segments may be removed. Each entire cam is composed of twelve segments so that the segments are not so large as to be clumsy to manipulate and also to provide a chip breaking action described hereinafter. This size cam also allows reasonably easy removal of the first segment between the spindles. Subsequent segments may be more easily removed because they may slide around somewhat.

The removal of each segment, however, is accomplished by loosening the holding screws and raising the segment somewhat and then tilting it as shown (Fig. 16) and bringing it out between the follower blocks. Installation of the new cam may be accomplished by reversing the operations. Thus, it is necessary only to remove the covers 61 preliminary to replacing a drum cam. This construction utilizes a close spacing of the spindles. It will be recognized that with a larger diameter machine or with fewer spindles, the spacing could be such as to allow removal of the segments without a tilting follower. However, these possibilities increase the cost or reduce the production rate of the machine and therefore are undesirable.

Movement of the spindles 318 by the drum cam is effective to carry the heads 335 toward and away from each other and thereby to drive a tool 354 through the blank and to pass it from one head to another. This movement may be modified to break chips formed by the tool in cutting material from the blank which may be desirable with certain classes of material, particularly when larger sizes of nuts are being threaded so that the chips will be of greater length which may cause jamming of the mechanism. This result is accomplished simply by offsetting certain of the cam segments 351 from the true line which the head would normally follow. This can be readily accomplished by grinding the cam to the desired feed with the segments 350 in a given relative position and then physically moving some of the segments in a direction which would cause a slight backing off of the tool cutting edge from the surface being cut, the overall result being an oscillation of the tool as the threads are cut. This motion is particularly desirable during the initial or roughing cuts, and the segments may be selectively offset to provide a chip-breaking action primarily during that period of motion of the tool. The amount of the offset may be of the order of the depth of cut being taken by the tool or somewhat less. Thus at the offset segments, if desired, the cutting edge may be almost completely backed off, thus breaking the chips. For most operations, this offset of the segments will be only a few thousandths of an inch and will readily be accommodated by the mounting of the segments. The reason such small offsets are effective to produce the desired result is formed in the roller type followers which fit snugly over the cam ridge 350 with substantially no clearance. This may be accomplished by preloading the followers. Therefore, any small variation in the cam is immediately transmitted from the follower through the spindle to the tool.

Precautions must be taken that the number of segments and the gear ratio of the spindle drive are not such that the tool is backed off each rotation at the same rotative position of the tool. It will be apparent that, if the tool is rotated an even fraction of a turn while the follower is traversing one segment, and with similarly offset segments, the cut will be a wavy line. However, if the tool is rotated something other than an even fraction, the initial cut will be wavy, but following cutting edges will smooth out the waves, because they will be retracted at other points in the cut. Thus the final result is a uniformly smooth cut and is free from tearing because of jammed chips, and also without waves because of the proper proportions of the machine.

In some cases it may be desirable, however, to cut a wavy line such as in the case of a product whose finished threads are of a high finish, for example. In such case it would be possible, with this type of cam construction, to offset certain sized cam segments to produce an action where the tool would cut first on one side of a thread and then the other to produce a wavy line. This wave could then be eliminated by a steady feeding final cut which would just shave off a very fine cut from the threads. This construction would require a longer tool with thread cutting edges ground for the particular cuts to be taken. The final cut being very thin could leave a fine finish on the threads as desired. Variations of these arrangements will readily occur to those skilled in the art.

Figure 17:
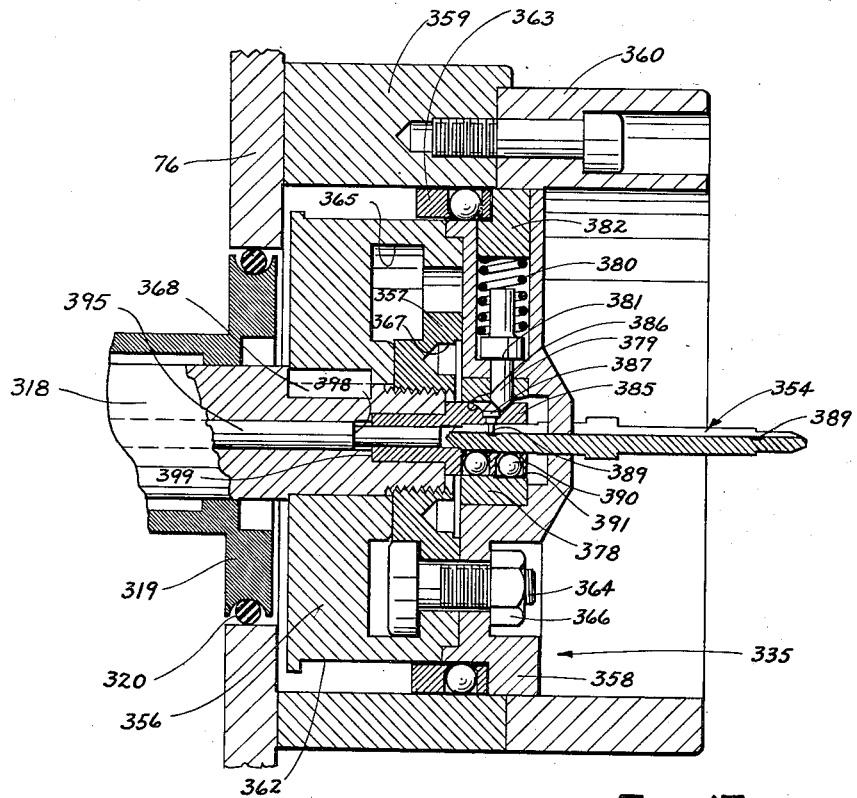
Fig. 17 is a sectional view on the vertical centerline of the head with an alternative mounting.
Figure 18:
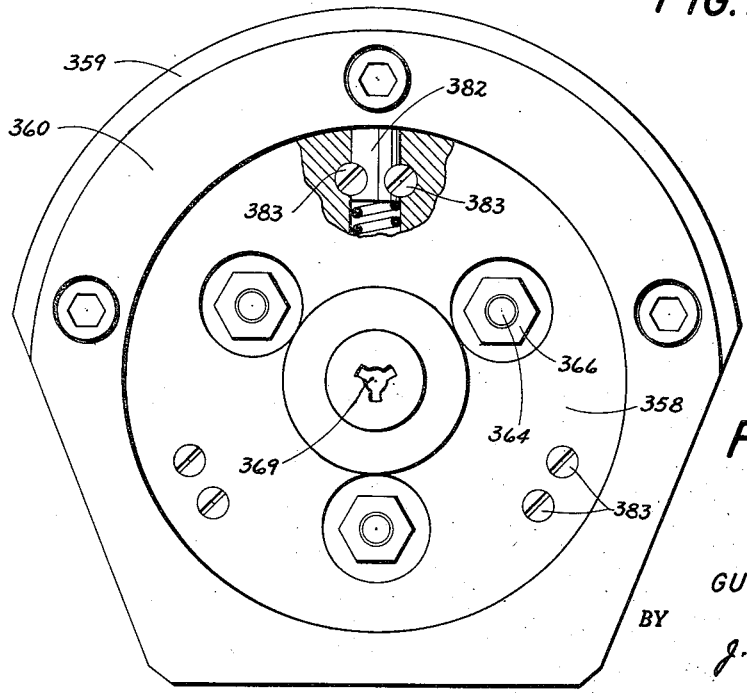
Fig. 18 is an end elevational view of the head mounted as in Fig. 17.

In Figs. 3, 15 and 23–31, the tool-carrying head 335 is shown carried unsupported at the end of the spindle. This is a very satisfactory construction for work of light to moderate nature. However, for heavy work, the modified construction shown in Figs. 17 and 18 may be desirable. In either case, the detailed construction of the head, as shown in Fig. 17 may be the same. In Figs. 17 and 18, the head is shown enclosed in a housing formed of two similar pieces 359 and 360 bolted together and fixed to the cover plate 76. These pieces are formed with an accurately machined and hardened inner cylindrical surface. The outer surface 362 of the base 356 of the head and of a portion of the front plate 358 are also hardened and ground. A bearing assembly 363 similar to those provided for the spindle in both formation and function is inserted in preloaded condition between the head and the housing to provide additional support for the head.

The head is formed of three principal pieces, a base 356, a retaining nut 357 and a front plate 358. These parts are held together by square headed bolts 364 engaged in an annular T-slot 365, formed by the base and retaining nut. The bolts 364 extend through spaced holes in the front plate and are fastened by nuts 366. The retaining nut 357 is screwed onto the end of the spindle and is formed with holes 367 to receive a spanner wrench. A key 368 engaged between the spindle and the base member 356 prevents relative rotation therebetween. The front plate 358 is formed with a central opening 369 shaped to fit the tool 354 which it is to carry (Fig. 18).

Figure 20:
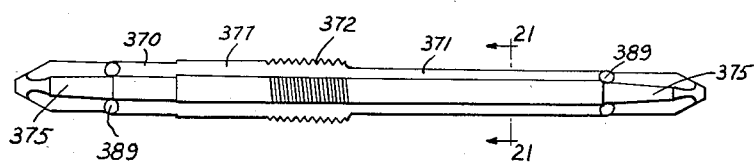
Fig. 20 is an enlarged elevational view of the tool alone.
Figure 21:
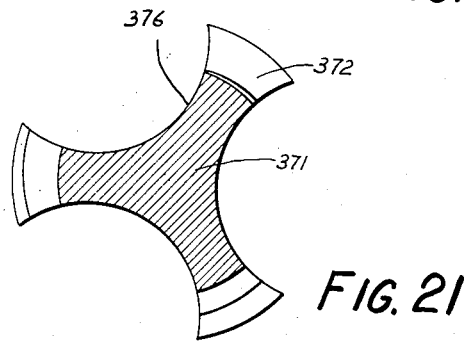
Fig. 21 is an enlarged sectional view of the tool along line 21—21 of Fig. 20.

The tool 354 (Fig. 20) is formed with two shanks 370 and 371 on the ends of a thread cutting portion 372. This thread cutting portion may be formed as any thread cutting tap. The shanks also may be symmetrical but preferably are formed as shown in the drawings. The tool, as viewed in Fig. 20, is initially supported by the right hand shank, while it is inserted through the nut, is then gripped by the other head on the left hand shank. Both shanks are held during the cutting operation, after which it is carried solely by the left hand shank and is withdrawn completely from the nut which is then discharged, after which the tool is passed back so that the right hand shank is picked up and held as initially, the left hand shank being released. At the ends 375, the shanks are pointed to assure easy entry into the head. The left hand shank 370 is formed in three different diameters; the first two being useful in holding and releasing the tool easily from the head as will appear later. The largest, 377, of the three diameters acts as a pilot diameter to center the nut blank as the tool is inserted into the hole in the center of the blank. This operation of the machine will also be described in greater detail hereinafter. Since there is no need for a pilot on the right hand shank 371 where the nut is discharged, this shank is formed with only the two diameters. In cross section (Fig. 21) the tool is formed with three equally spaced grooves 376 leaving three lands which are substantially complementary to the opening 369 in the front plate of the head. It will be obvious that more grooves and lands could be used, but three is the preferred number, since, then, the tool is sure to be driven at all three points.

The head is formed with novel holding means for the tool which provides for easy insertion and ejection of the tool while, at the same time, assuring positive driving and removing any play from the grip. The driving is accomplished primarily by the engagement of the shank 370 or 371 with the opening 369 in the head. The other characteristics are obtained from a loaded bearing arrangement formed in the head by the following described means. A hardened bushing 378 is pressed into the front plate 358 at its center. At three equally spaced radii, pins 379 extend through openings in this bushing and the front plate. Each of these pins is pressed toward the center by a spring 380 engaged between a shouldered seat 381 and a plug 382. The spring, seat and plug are disposed in three equally spaced radial holes in the front plate. As best shown in Fig. 18, the plug 382 is held in the head by two screws 383 extending into the front plate and engaging notches on both sides of the plug.

A retainer bushing 385, slidably disposed in an opening in the center of the bushing 378, is provided with three elongated dimples 386 equally spaced about its periphery. Centrally disposed in the dimple is provided a pin 387 having a near conical or chisel-pointed head to match the point of the pin 379. The pin 387 extends through and is slidable in a hole in the bushing 385. Thus the pointed pins 379 act as detent pins on the bushing in two positions, one on each side of the pin 387. In addition to acting as a detent, the pin 379 holds the bushing and prevents it from rotating out of line with the tool and also transmits some of the force of the spring 380 to the headed pin 387 urging it also in an inward direction against the shank 370 or 371 of the tool 354. A dimple 389 formed in the shank 370 at the proper location provides surfaces engaged by the pin 387 which acts as a detent and holds the tool in place in the head.

In each angular space between the pins 379, the bushing 385 is formed as a bearing retainer containing two balls 390. The diameter of these balls is greater than the thickness of the bushing, thus allowing them to roll. When the tool 354 is in its inserted position (Fig. 17), the balls are engaged in a loaded state between the lands of the shank on the tool, and the inner surface of an opening 391 in the bushing 385. Thus the tool is supported at two longitudinal points at each of three circumferential locations. This support is very secure being obtained by the deformation of a steel ball of approximately .0005 inch on the diameter, although this amount may be varied according to the size of tool used. These balls could also press into the grooves or flutes. This is particularly true where three or two flutes are used. In such a case, the flutes could be stepped in a manner similar to the lands in the preferred embodiment.

Figure 19:
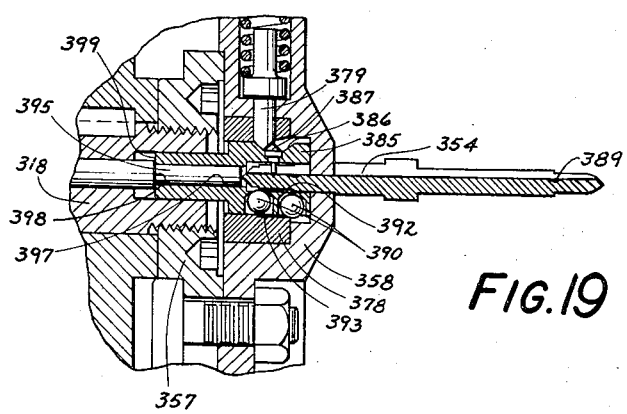
Fig. 19 is a fragmentary view similar to Fig. 17 showing the tool shank in a partly retracted position.

It will be noted that both the surface of the opening 391 and the lands of the shanks 370 and 371 are stepped, and that these steps are equal so that the balls may be of the same diameter and be equally loaded. As the tool is ejected to the position shown in Fig. 19, the balls are rolled on the bushing 378 by the movement of the tool, thus causing the retainer 385 to move outwardly also. However, the tool does not have to roll out of engagement with both balls in the row. If that were required, movement of the tool and of the retainer 385 would be more than could easily be accommodated. Therefore, the stepped construction is used. As illustrated in Fig. 19, after the tool has rolled a short distance, the balls 390 nearest the outer face of the head roll off the step 392 on the shank of the tool. At the same time, the other balls are rolling off the step 393 in the inner surface of the bushing 385. The magnitude of the steps is such that the tool is then released and is free to pass out of the head. At this point, the retainer bushing 385 has rolled to the position where the spring pressed pin 379 has passed over the head of the pin 387 and is thus in position to locate the bushing at its outer position. It will be recognized that by using different sized balls on the two (or more) longitudinal positions, only one of the pressure surfaces need be stepped to accomplish the desired result.

The tool is pushed out of the head by a rod 395 extending through a central opening 396 in the spindle. The retainer bushing has a hole 397 extending through it to receive the rod which can therefore engage the end of the tool to push it. The rod 395 is formed with a shoulder 398 adapted to engage the rear face 399 of the retainer to assure that it is moved to its outer position in place to receive the tool when it is again picked up by the head.

Movement of the rod 395 is induced by a cam and follower arrangement at the opposite end of the spindle from the head (Fig. 15). At this end, a collar 400 is formed on the rod to engage a small ball thrust bearing 402 held in a follower member 403. The follower member is freely journalled on the end of the spindle 318, so that it is carried by the spindle, but leaves the spindle free to rotate while the follower may be sliding longitudinally of the spindle. A roller 404 journalled in the member 403 engages a cam track 405 which extends into a slotted opening in the member 403. A spring 406 engaging the member 403 and the cover 333 urges the member 403 against the cam track 405, but in order to assure positive following by the follower, a radially extending roller 407 may be used engaging the surface of a second cam track 408. The tracks 405 and 408 may preferably be separate for ease of assembly.

The cam tracks 408 and 405 are provided with matched surfaces since they operate on the same follower. The shape of the tracks and the corresponding shape of the cam formed by the ridges 250 on the segments for both sides of the machine is shown in Fig. 22. In this figure, the lines 405a representing the rise and dwell of the cam face 405 are at the top and bottom with the line 350a representing the drum cam ridges 350 near the center similar to the positions in the machine. The particular shape of these cams can best be explained with respect to the operation of the machine.

Operating

In its operation, as explained heretofore, the machine in its preferred embodiment is driven with two motions. The shaft 40 carrying the bull gears 47 rotates in a direction such that the top of the gears are approaching the observer in all figures. The drum carrying the spindles and work-holding device rotates in the opposite direction.

In Figs. 23–30 inclusive are shown eight positions of the spindle as it passes around the machine. These stations, however, are not stopping points, for the rotation of the device is continuous. The operation of threading the nut may best be explained by a detailed reference to these figures. These figures are viewed from a longitudinally extending plane through a single pair of spindles as they pass around the machine. Each of the figures has been shown in an upright position, including those which normally would have been inverted because they were taken at or near the bottom of the machine. This was done so that comparisons of the figures might be made more easily on uniformly positioned views.

In Fig. 23 which may be taken as the first station, the nut blank has just been injected into the workholder mechanism 66. The clamp 261 is held open by the cam formed on the support 148 and the tool 354 is firmly held in the right-hand head 335 which is substantially fully retracted by the cam on the segments 351. The right hand central rod 395 is also retracted as its follower 403 follows the right hand cam fully to the right. This position corresponds approximately to the position marked 330 degrees on the graph in Fig. 22. It will be noted that the left hand head 335 is located just slightly to the left of its completely extended position.

As the spindle moves from the first station to the second station (Fig. 24), the left hand head moves slightly to the right into the hollow 275 formed in the face plate 210 to pick up the tool. At the same time, the right hand head moves quite rapidly to the left causing the tool to enter the hole in the nut blank. During this motion, the hole in the blank is centered on the pilot part 377 of the tool 354 (Fig. 20). This is made possible because the clamp 261 is held open for a sufficient length of time and because the wrench member 220 is allowed a sufficient degree of movement as hereinbefore described. As soon as the blank is centered, however, the clamp member 261 is released and clamps the nut blank securely against the face plate. The blank is, therefore, properly centered on the tool and is firmly held in position so that the centerline of the threads will be perpendicular to that face of the blank which is against the face plate. The positions of the mechanisms shown in Fig. 24 are those immediately after the clamp is released by the cam, and would appear at approximately 15 degrees on the graph. It will be noted that the cams 405 follow almost exactly the spindle cams 351 between these stations; the only visible deviation being at about 330 degrees where the left hand head moves forward without the rod 395 following. This, however, is wholly unimportant, for the tool is not held in this head, and the retainer housing 395 (Figs. 17 and 19) has already been positioned as will appear later.

The actual cutting takes place between the second and fourth stations (Figs. 24–26). In the second station, the left hand head has already engaged the shank of the tool and is driving it on the flutes, although in this embodiment the tool is so short that it has not been firmly seated in the head. The tool is made short so that it will not break as easily because of a long extension and so that it will be more rigid. It will be recognized, however, that with larger tools it would be feasible and might be desirable to seat the tool securely in both heads before starting the thread cutting operation. As the spindles progress, the right head is fed to the left, forcing the tool through the blank. This motion appears in the sloping lines of the right hand cams (Fig. 22) between about 30 degrees to just before 150 degrees. This is actually the working time of the tool. The cams are designed to feed the tool at the proper pitch for the desired thread, and this is one principal reason for the desirability of easy interchange of cam segments particularly in view of the different pitch thread systems for a single diameter screw now commonly in use.

During this feeding, the left hand head is substantially dwelling at its most extended position. The tool is continuously fed into the head, reversing the rolling of the balls 390 (Figs. 17 and 19) previously described, and seating the tool firmly in the left hand head. If the rod 395 is not properly retracted to the left at the time, the tool will slide it back against the thrust bearing 402 (Fig. 15). Also during this movement, the retainer bushing 385 is moved back to its position shown in Fig. 17 by the rolling action of the balls.

At the fourth station (Fig. 26), which corresponds to a point near 180 degrees in the graph (bottom center or BC), the tool is pushed out of the right hand head by the rod 395 which, in turn, is actuated by the slight rise in the cam noticeable between 150 and 180 degrees (BC) in the bottom line of the graph. This rise in the cam is effective to force the tool out of the holding of the right hand head and to seat it firmly in the left hand head. At the same time, the retainer bushing 385 in the right hand head is positioned by the shoulder 398 on the rod 395.

At this point, too, the left hand head begins to recede from the work holder plates 66 and to carry the tool back with it. This is apparent from the plots of the left hand cams in Fig. 22. As the spindles progress to the fifth station (Fig. 27) the tool 354 is completely withdrawn from the now completed nut. The clamp also is engaged by the cam on the support 148 again and is opened, and the nut is discharged by the pusher bar 227 into the outlet chute as hereinbefore described.

The next three stations (Figs. 28–30 incl.) show the transfer of the tool from the left hand head to the right hand head. This is accomplished while the clamp is held open and there is nothing held therein. This motion is similar to the passing of the tool in the other direction except that there is no feeding cycle, and therefore the exchange can be made more quickly. The exchange, in fact, is accomplished while the spindles pass from about 210 to just past 270 degrees in the graph. In this space, the right hand head is substantially at a dwell in its furthest extended position. The left hand head quickly approaches it along the upper cam line 350a until the tool is completely inserted into the right hand head. As that head begins to pull away at approximately 270 degrees, the left-hand cam 405 as represented by the line 405a continues to push its rod 395 outward until the spindle reaches about 285 degrees, thus dislodging the tool from the left hand head and setting the retainer bushing.

As the spindles pass beyond this point, the right hand head is fully retracted whereupon the next nut blank is injected and the cycle starts again.

From the foregoing description, it can be seen that the spindle cam 350 and the push rod cam 405 could be substantially parallel for all except a very small part of the travel of the spindles. Since this is true, it is obvious that the push rod 395 could be carried with spindles throughout most of their travel, and only short wedge-shaped cams used where necessary to push the tool out of the respective heads. If such cams were to be used, the follower could be merely the end of the push rod which could slide on the cam for a short distance, or the follower could be formed by a ball retained on the end of the rod in a manner described hereinafter with reference to one of the alternative uses of the machine.

During the movement of the spindles longitudinally, they are also rotated because of the meshing of the pinions 48 with the gear 47. Since the spindles on one side are driven in unison with those on the opposite side, they are always in position to pass and receive the tool, and both are effective to drive the tool during the threading operation. The preloaded bearings 324, 327, and 330 (and also the bearings 363 if the housing 359, 360 of (Figs. 17 and 18) is used) are capable of both rotary and longitudinal motion, thus insuring a complete lack of "play" or "whip" in the spindles. Thus the spindle is always true, and since the nut blank is true, and both tool and blank are securely held, the threads will be cut to much closer tolerances than with prior machines using the conventional type tool are ground according to the disclosure of my aforesaid co-pending patent applications, the finish of the threads will be smoother, thus resulting in a greatly improved product.

It will be recognized that the number of spindles in a machine built according to my invention is not fixed, but that more or fewer could be used. If more spindles were used and the machine driven at the same rotational speed, the output would be proportionately faster. Thus it is possible with a multi-spindle machine to produce as many as 2500 nuts per minute as compared with present day production with conventional machines of from 50–100 nuts per minute. Moreover, the tool is no more expensive and perhaps less expensive than present day hook taps and, if made of suitable material, will last several times as long measured by the number of nuts produced per tap. This is true because of the complete lack of undesired relative motion between the tap and the nut blank, and because the use of fine fast cutting materials is feasible only with such a small tool. Thus my invention makes possible not only a greater production, but the upkeep cost, so far as tools go, is considerably less.

*Cooling and lubrication*

In a machine which operates at the speed of the present device, it is imperative that the cutting tool be properly flushed with cutting fluid, both for cooling and lubrication. Moreover, it is essential that metal chips be quickly removed from around the moving parts of the mechanism to prevent jamming. In order to accomplish this, a novel pressure system of cutting fluid distribution has been developed. This system is best shown in Fig. 31, where the center of working section of the machine is shown.

It will be noted that an alternative shaft 40' and hub member 64' are shown in this figure. This is for the purpose of separating the center section of the machine so that the work holder plates may be made in a single piece and slipped over the hub member 64' instead of being formed in two parts as shown before to be placed around the hub. In order to accomplish the desired result, the shaft is shown as having a tongue and groove joint 401 which may be separated. It will be recognized by those skilled in the art that many other types of connections, such as a splined shaft and socket, may be used here. The only other alteration necessary is to make the left hand flange 409 of a diameter equal to or slightly smaller than the central hole in the workholder plates. The assembly and disassembly of this device will be obvious to those versed in the art.

Cutting fluid of any preferred type is pumped into the center section by the oil pump located in the rear housing 17 and driven by the motor 18. Sometime before it reaches this section, the flow is divided into three streams; one leading to a nozzle 410, and the other two leading through oil lines 411 to the upper part of the guide member 9. The nozzle 410 may be supported in the center section by any convenient means and is directed so that the oil flow will impinge on the tool 354 and nut blank at the time the tool begins the cutting operation.

The lines 411 lead into holes 412 drilled or otherwise formed in the guide member 9. While the holes are shown only extending across the top, it will be recognized that they could connect with vertical holes in the sides and another horizontal hole across the bottom if desired. These holes act as manifolds and are intersected by a series of radial holes 413 leading into the manifold from a groove 414 cut entirely around the inner opening in the member 9. A hole 415 is drilled from the outer radius of the rim 416 of the support member 71 through that member and through the bushing 319 at each spindle location. These holes 415 extend into an annular relief groove 417 in the bushing 319 which thus provides a chamber surrounding the spindle 318. Any fluid which may escape from this chamber along the spindle serves to lubricate the spindle in the bushing and therefore is not wasted. The chambers 417 extend along the spindle a distance equal to the normal travel of the spindle, and a hole 418 leads from the outside of each spindle into the central opening in which the push rod 395 is disposed. This hole 418 is so located that its opening never passes beyond the confines of the chamber 417 in the normal travel of the spindle. Thus, a continuous oil pressure is maintained to the center of the spindle.

The flow of fluid is from the lines 411 to the manifolding holes 412 and thence to the groove 414 through the holes 413. The fluid in the groove is obviously under continuous pressure. This is one reason for the use of the rim 416 on the member 71. By this formation, a labyrinthine passage is formed deterring any great flow of oil outward at this point. The oil which does escape lubricates the surfaces of the support member 71 and guide member 9 and also adjacent surfaces which move relative to the guide member 9, such as those of the cover 76 and the wall member 63. Since the groove 414 is continuous, it is always open to the holes 415 opening into the chamber 417. From the chamber 417, flow may be continuous into the hole 418 and therefore into the center of the spindle. From the center of the spindle, the fluid will flow primarily toward the head because of the shorter path, and there will discharge through the flutes of the tool. The fluid thus discharged is very effective in flushing chips off the tool, since it is under pressure and flows outwardly from the central part of the tool. Lubrication is also provided to the moving parts of the head by this means as well as additional cooling. Chips are also prevented from entering the head when the tool is not carried thereby, because of the continuous flow of fluid. This system is exactly similar for all spindles on both sides of the work-holding mechanism 66.

A system for lubricating and flushing the workholding mechanism is also provided, with the fluid coming from the right hand guide member as best shown in the lower right hand part of Fig. 31. This illustrates a section through the spindle carrying drum at a plane between the spindles. At this plane, between each adjacent pair of spindles, a fluid conducting hole 420 extends from the rim 416 of the member 71, through a part of the end member 63 and connects with holes 421 in the hub member 64 which extend through the shoulder 65. These holes 421 connect with an annular manifolding groove 422 formed in the hub 262 of the spider 209 (Fig. 5). From this groove, small holes 423 extend through the spider 209, and the carrier member 218 into oil grooves 424 formed in the carrier (Fig. 8). This groove connects with both the rack 232 and pusher 227 and with the larger groove 425 extending from the base of the wrench 220 to the clamp bolt 264. Thus, fluid is discharged under continuous pressure to the nut ejecting mechanism, to the wrench mechanism, and to the clamping bolt. From the groove 235 in which the rack is disposed, fluid will also flow around the gear member 238. Thus, the moving parts of the work holder are effectively lubricated by this continuous pressure system. In addition, the fluid is discharged primarily from around the wrench 220 and the pusher bar 227 so that chips are effectively washed away from the mechanism thus preventing jamming.

It will be apparent from the above description that by the continuous pressure system there disclosed, the working section of the machine is not only completely lubricated but is continuously flushed with fresh fluid to carry chips, dirt and the like, away from the working part of the machine. These chips, dirt, and so forth, are carried in the oil to a sump formed between the center supports 14 in a manner well known in the art. From the sump, the fluid passes through any preferred commercial cleaner which may include filters, magnetic devices and the like, and from thence may be pumped through the system again.

It will be further apparent that with tools formed of sintered carbide or similar hard materials where no cutting fluid is required, air under pressure would be used in placed of a cutting fluid. This air could be forced through the same passages and would be effective to blow the chips out of the mechanism in a manner similar to the washing action of the cutting fluid.

Although the machine throughout has been described as comprising a drum member carrying the spindles in a rotational direction, it is within the ability of one skilled in the art to conceive that the cams could be developed and the spindles carried in a straight path with a reciprocatory motion or in some other path. In such a machine, the spindles could be mounted similarly, the operation of the tools, spindles and ejector means both in the spindles and in the work holder could be exactly similar to the operation in the originally described embodiment. Structure of each individual wrench and clamping member could also be similar. Thus my invention is not wholly limited to a rotating machine.

It is apparent that I am aware that numerous and extensive changes may be made in the embodiments described without departing from the spirit or scope of my invention which is to be measured only by the accompanying claims.

I claim:

1. A forming machine comprising a base, spindle supporting means rotatably journalled in said base, workholding means carried by said suporting means adapted to hold a workpiece in position to be operated on by each of said tools, a plurality of tool holding spindles carried by said supporting means in axially aligned pairs of which one spindle of each pair is located at opposite sides of said work-holding means, drive means drivingly connected to said supporting means for rotation thereof, operating means for said spindles adapted to operate said spindles upon rotation of said supporting means, and feed means operated by said rotation of said supporting means to positively inject the workpiece into said work holder, said spindles each being formed with a longitudinal bore therethrough, rod means slidably disposed in each bore, and cam means engaging said rod means to move it longitudinally, said rod being thereby adapted to move the tool from one spindle into the other.

2. A forming machine comprising a base, spindle support means rotatably mounted on said base, drive means adapted to drive said support means, spindle means arranged in pairs, each pair having one member opposite the other, preloaded anti-friction means disposed between said spindle means and said support means to journal said spindle means in said support means, said spindles being adapted to be driven by said drive means as said support means is rotated, work holder means carried by said support means between said opposed spindles, a clamping device on said work holder means for each pair of spindles, said clamping device being adapted to receive a work blank, work blank injector means mounted on said base and driven by said support means, said injector being adapted to inject said blanks into said clamping devices as each device reaches a first predetermined position, tools carried by said spindle means adapted to operate on said blank, cam means on said base adapted to control the longitudinal position of said spindle means, means for passing the tool from one spindle to the other including tool ejector means slidably mounted in each spindle and other cam means for actuating the tool ejector means, work ejector means carried by said work holder adapted to eject said blank from said clamping device as it reaches a second predetermined position after the operations of said tool, and cam means mounted on said base adapted to hold said clamping devices open at both said first and second positions.

3. A forming machine comprising a base member including a base plate, end standards mounted on said plate, a main shaft journalled in said end standards, a motor in driving engagement with said shaft, stationary members mounted on said end standards, a drum member rotatably journalled on said stationary members and on said shaft, drive means engaged between said main shaft and said drum member to rotate said drum member in a direction opposite to said shaft, said drum member including two outer end walls at opposite ends thereof, two inner end walls near the center of said drum member, spindle supporting members and cover members rigidly joining said inner end walls to said outer end walls, and a hub member joining the two inner end walls together, said spindle supporting members being formed with an internal flange, spindles journalled in said inner and outer end walls and in said flange, said spindles being disposed in pairs having one member opposite the other, gear means on said shaft engaged with pinion means on said spindles to drive said spindles rotatively, cam means on said stationary members, follower means rotatably journalled but longitudinally fixed on said spindles, said follower means engaging said cam means to control the longitudinal position of said spindles, work holder means fixed to said hub member including wrench means to hold a work blank from rotating, clamp means to hold said work blank from lateral motion, and ejector means to eject said blank from said wrench member, support means mounted on said base mmeber partially surrounding said work holder, work blank injecting means mounted on said support means and operated by means on said drum member to inject a blank into said wrench member as each wrench member is carried past said injector, cam means formed on said support member to hold said clamp means open during injection and ejection of said work blanks, feed control mechanism connected to said injecting means to force a continuous stream of blanks always under pressure to said injecting means, tool holding heads on said spindles, tools releasably held by said spindles adapted to perform forming operations on said blanks under control of said cam means, rod means centrally of said spindle extending into said heads, and second cam means formed on said end standards, adapted to engage said rod to cause it to force said tools from one head into the head of its paired spindle member.

4. A forming machine comprising a base, a spindle drum rotatably mounted on said base, a drive shaft adapted to drive said drum continuously, a pair of axially aligned rotatable tool spindles slidably mounted in said drum with their confronting ends spaced from each other, a gear connection within said drum between said drive shaft and said spindles whereby said spindles are rotatably driven as said drum is continuously rotated, a work holder including a normally closed work clamp adapted to hold a work piece against axial movement between said axially aligned tool spindles mounted on said drum for rotation therewith, a work-receiving position and a work-discharging position, means mounted on said base adapted to hold open said work clamp at said work-receiving position and at said work-discharging position, cam means within said drum for differentially reciprocating said spindles toward and away from each other during each revolution of said drum, a tool chuck carried at the confronting ends of said spindles adapted respectively to engage in driving contact opposite ends of a forming tool, and means independent of said cam means for axially moving a tool held in either of said chucks to the other and engaging the same therein.

5. The invention of claim 4, in which there are a plurality of pairs of tool spindles spaced about the circumference of the drum.

6. The invention of claim 4, in which there are a plurality of pairs of tool spindles spaced about the circumference of the drum and in which the work holder has a work clamp between the confronting ends of each pair of spindles.

7. The invention of claim 4, in which a power driven work injecting mechanism is located on said frame at said work-receiving station and in which the work injecting mechanism is driven from said power shaft to effect positive delivery of a work piece to said work clamp each time said work clamp passes said work-receiving position.

8. The invention of claim 4, in which said work clamp comprises an axially fixed disc and a pivoted jaw urged by spring means into work clamping position against said disc.

9. The invention of claim 4, in which said work holder comprises an axially fixed disc, a work-receiving socket having limited radial movement on said disc, and a pivoted jaw urged by spring means into work clamping position against said disc.

10. The invention of claim 4, in which the means for holding open said work clamp comprises a cam adapted to coact with said clamp.

11. The invention of claim 4, in which said work clamp comprises an axially fixed disc and a pivoted jaw urged by spring means into work clamping position against said disc and in which the means for holding open said work clamp comprises a cam adapted to engage the free end of said jaw and bias the same to open position against the force of said spring means.

12. The invention of claim 4, in which the means for axially moving a tool held in either of said chucks comprises a rod reciprocably mounted in respect to said spindles.

13. The invention of claim 4, in which the means for axially moving a tool held in either of said chucks comprises a sliding rod at the axis of said spindles and cams fixed in said base with which said rods contact for controlling their longitudinal position in said spindles.

References Cited in the file of this patent

UNITED STATES PATENTS

| | | |
|---|---|---|
| 695,760 | Nolan | Mar. 18, 1902 |
| 899,915 | Smith | Sept. 29, 1908 |
| 1,021,242 | Fishburne | Mar. 26, 1912 |
| 1,043,192 | Beck | Nov. 5, 1912 |
| 1,141,779 | Daniels | June 1, 1915 |
| 1,195,145 | Mattingly | Aug. 15, 1916 |
| 1,435,959 | Fulton | Nov. 21, 1922 |
| 1,458,300 | Jarvis | June 12, 1923 |
| 1,538,670 | Stanley | May 19, 1925 |
| 1,557,715 | McCain | Oct. 20, 1925 |
| 1,603,852 | Mitchell | Oct. 19, 1926 |
| 1,651,279 | Kiehl | Nov. 29, 1927 |
| 1,736,581 | Crehan | Nov. 19, 1929 |
| 1,883,993 | Lee | Oct. 25, 1932 |
| 1,901,579 | Barber | Mar. 14, 1933 |
| 1,990,188 | Kabbel | Feb. 5, 1935 |
| 1,999,816 | Lindenmuth et al. | Apr. 30, 1935 |
| 2,238,064 | Kraus | Apr. 15, 1941 |
| 2,243,822 | Herrmann | May 27, 1941 |
| 2,246,865 | Stimson | June 24, 1941 |
| 2,319,544 | Harley et al. | May 18, 1943 |
| 2,325,627 | Neilson | Aug. 3, 1943 |
| 2,379,242 | MacNeill | June 26, 1945 |
| 2,387,446 | Herz | Oct. 23, 1945 |
| 2,388,779 | Boehmler | Nov. 13, 1945 |
| 2,390,649 | Hoffman et al. | Dec. 11, 1945 |
| 2,420,296 | Bishop | May 13, 1947 |
| 2,422,774 | Conner | June 24, 1947 |
| 2,424,113 | Norberg et al. | July 15, 1947 |
| 2,425,988 | Brisben | Aug. 19, 1947 |
| 2,509,696 | Pegard | May 30, 1950 |
| 2,514,775 | Mackintosh | July 11, 1950 |
| 2,556,601 | Schofield | June 12, 1951 |
| 2,561,069 | Peterson | July 17, 1951 |
| 2,567,576 | Palumbo | Sept. 11, 1951 |
| 2,587,352 | Manning | Feb. 26, 1952 |

FOREIGN PATENTS

| | | |
|---|---|---|
| 55,472 | Germany | Feb. 28, 1891 |

U. S. DEPARTMENT OF COMMERCE
PATENT OFFICE

CERTIFICATE OF CORRECTION

Patent No. 2,828,492      Guy O. Conner      April 1, 1958

It is hereby certified that error appears in the printed specification of the above numbered patent requiring correction and that the said Letters Patent should read as corrected below.

Column 4, line 42, for "slide" read -- slid --; column 12, line 20, for "pinion" read -- pinions --; line 50, for "bushing 32" read -- bushing 323 --; column 18, line 13, for "housing" read -- bushing --; column 19, line 39, after "type" insert -- hook tap. --; same line, beginning with "tool are ground" strike out all to and including "improved product." in line 42, same column; column 21, line 42, for "placed" read -- place --.

Signed and sealed this 17th day of June 1958.

(SEAL)
Attest:

KARL H. AXLINE
Attesting Officer

ROBERT C. WATSON
Commissioner of Patents